United States Patent
Murata

(10) Patent No.: US 9,081,531 B2
(45) Date of Patent: Jul. 14, 2015

(54) SYSTEM, IMAGE FORMING APPARATUS, AND METHOD THEREFOR

(71) Applicant: CANON KABUSHIKI KAISHA, Tokyo (JP)

(72) Inventor: Tomomi Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/169,450

(22) Filed: Jan. 31, 2014

(65) Prior Publication Data

US 2014/0218764 A1     Aug. 7, 2014

(51) Int. Cl.
| | |
|---|---|
| G06K 15/00 | (2006.01) |
| G06F 3/12 | (2006.01) |
| H04N 1/00 | (2006.01) |
| G06F 15/167 | (2006.01) |

(52) U.S. Cl.
CPC .............. *G06F 3/126* (2013.01); *G06F 3/1204* (2013.01); *G06F 3/1258* (2013.01); *G06F 3/1267* (2013.01); *G06F 3/1285* (2013.01); *H04N 1/00* (2013.01)

(58) Field of Classification Search
CPC ............ H04N 1/0023; H04N 1/00233; H04N 1/00228; G06F 3/126; G06F 3/1285–3/1288; G06F 3/1267; G06F 3/1258; G06F 3/1204; G06F 3/00; G06F 13/00; G06F 12/0868
USPC ........ 358/1.11–1.18, 400–404; 709/204, 205, 709/213, 217–219, 238
See application file for complete search history.

(56) References Cited

U.S. PATENT DOCUMENTS

| | | | | |
|---|---|---|---|---|
| 6,597,469 | B1* | 7/2003 | Kuroyanagi | 358/1.15 |
| 7,191,237 | B2* | 3/2007 | Jodra et al. | 709/228 |
| 8,547,566 | B2* | 10/2013 | Isshiki | 358/1.14 |
| 8,625,138 | B2* | 1/2014 | Ida et al. | 358/1.15 |
| 2005/0219612 | A1* | 10/2005 | Nakagawa | 358/1.15 |
| 2009/0260017 | A1* | 10/2009 | Yoshida | 718/105 |
| 2010/0171982 | A1* | 7/2010 | Sato | 358/1.15 |
| 2011/0279859 | A1* | 11/2011 | Hashimoto | 358/1.15 |

FOREIGN PATENT DOCUMENTS

JP         2005-091600 A     4/2005

* cited by examiner

*Primary Examiner* — Chad Dickerson
(74) *Attorney, Agent, or Firm* — Canon USA, Inc. I.P. Division

(57) ABSTRACT

An image forming apparatus receives a job list of a user using the image forming apparatus from a document management server, and, in response to the user instruction, receives from the document management server print data corresponding to a job selected from the job list, and prints the received print data. Further, in response to the user instruction, the image forming apparatus requests the document management server to enable a specified other user to print a job selected from the job list. According to the user instruction, the document management server adds data corresponding to the job selected from the job list of the user to the job list of the specified other user.

13 Claims, 21 Drawing Sheets

FIG.6

| DATA ITEM | EXAMPLE |
|---|---|
| IMAGE FORMING APPARATUS USER NAME | UserA |
| LAST LOGIN DATE AND TIME | 11:45 Aug. 6, 2012 |
| REMAINING JOB AT TIME OF LAST LOGIN | ○○○○○○○○.doc<br>××××××××××××.pdf<br>△▽▲▼△▽▲▼△▽▲▼.pdf<br>□□□.txt |

FIG.8

USER: UserA

JOB LIST

| SELECTION | REQUESTOR | DOCUMENT NAME | UPDATE DATE AND TIME |
|---|---|---|---|
| ☐ | UserA | ○○○○○○○.doc | hh:mm mm/dd/yyyy |
| ☐ | UserD | ×××××××××.pdf | hh:mm mm/dd/yyyy |
| ☐ | UserC | △▽▲▽▲▼△▽▲▼.pdf | hh:mm mm/dd/yyyy |
| ☐ | UserA | □□.txt | hh:mm mm/dd/yyyy |
| ☐ | UserB | ○○○○○○●●○.xls | hh:mm mm/dd/yyyy |

[ PRINT ] [ DELETE ] [ PRINT REQUEST TO OTHER USER ] [ DISPLAY TALLY RESULTS SCREEN ]

[ LOGOUT ]

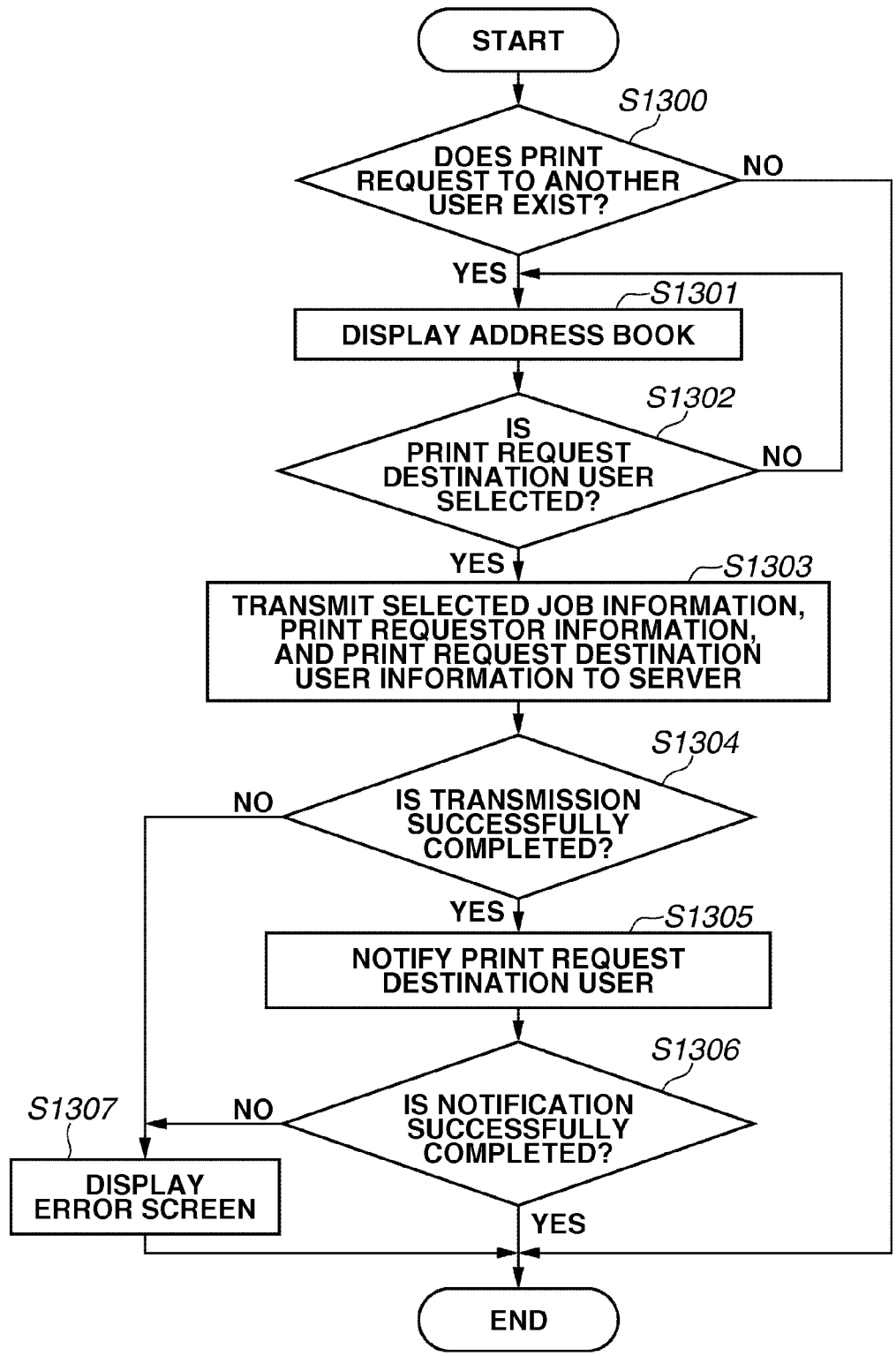

FIG.12

| DATA ITEM | EXAMPLE |
|---|---|
| PRINT REQUESTOR NAME | UserB |
| DEPARTMENT ID OF PRINT REQUESTOR | 11112 |
| PRINT REQUEST DESTINATION USER NAME | UserA, UserC |
| DEPARTMENT ID OF PRINT REQUEST DESTINATION USER | 11113, 11115 |
| PRINT REQUEST DATE AND TIME | 09:00:00 Aug. 02, 2012 |
| DOCUMENT NAME OF PRINT REQUEST JOB | ○●○●●○○●○○●●○.xls |
| PAPER SIZE | A4 |
| PAGE COUNT | 15 |
| COLOR/MONOCHROME | MONOCHROME |
| PRINTING DEADLINE | Dec. 31, 2012 |
| MESSAGE | PLEASE PRINT THIS DOCUMENT BEFORE 3 PM MEETING. |

FIG.14

JobList2
User: UserB — 1601

| MANAGEMENT NUMBER | REQUESTOR | RECEPTION DATE AND TIME | DOCUMENT NAME | PAPER SIZE | PAGE COUNT | COLOR/ MONOCHROME | PRINTING DEADLINE | MESSAGE |
|---|---|---|---|---|---|---|---|---|
| 1 | UserD | mm/dd/yyyy | x x x x x x x x x x x.pdf | A4 | 30 | MONOCHROME | mm/dd/yyyy | FOR STRATEGY MEETING |
| 2 | UserA | mm/dd/yyyy | □□□.txt | A4 | 1 | MONOCHROME | mm/dd/yyyy | FOR MT |
| 3 | UserB | mm/dd/yyyy | ◆◆◇◇◇.xls | A3 | 2 | COLOR | mm/dd/yyyy | |
| 4 | UserB | mm/dd/yyyy | ○○○●●●○○●●○.xls | A4 | 15 | MONOCHROME | Dec. 31, 2012 | |

1602 — 1603

JobList1
User: UserA

| MANAGEMENT NUMBER | REQUESTOR | RECEPTION DATE AND TIME | DOCUMENT NAME | PAPER SIZE | PAGE COUNT | COLOR/ MONOCHROME | PRINTING DEADLINE | MESSAGE |
|---|---|---|---|---|---|---|---|---|
| 1 | UserA | mm/dd/yyyy | ○○○○○○○.doc | A4 | 3 | COLOR | mm/dd/yyyy | |
| 2 | UserD | mm/dd/yyyy | x x x x x x x x x x x.pdf | A4 | 30 | MONOCHROME | mm/dd/yyyy | FOR STRATEGY MEETING |
| 3 | UserC | mm/dd/yyyy | △▽▲△▽▲△▽▲▼.pdf | A4 | 24 | COLOR | mm/dd/yyyy | FOR MT |
| 4 | UserA | mm/dd/yyyy | □□□.txt | A4 | 1 | MONOCHROME | Dec. 31, 2012 | |
| 5 | UserB | 09:00:00 Aug. 02, 2012 | ○○○●●●○○●●○.xls | A4 | 15 | MONOCHROME | Dec. 31, 2012 | PLEASE PRINT THIS DOCUMENT BEFORE 3 PM MEETING. |

1604

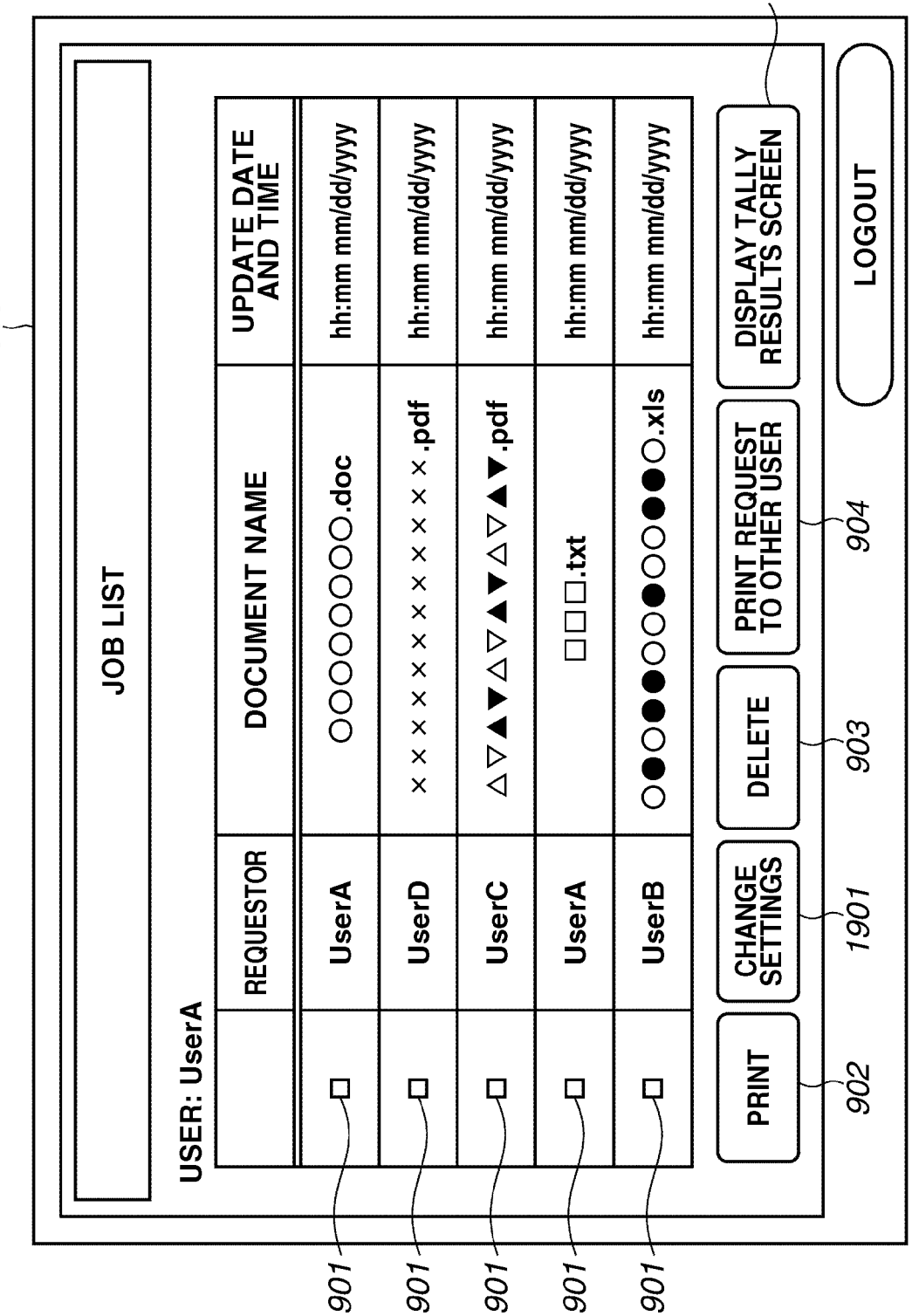

FIG.17B

CHANGE PRINT SETTINGS

USER: UserA
DOCUMENT NAME: ○●●●○○●●●○.xls

| COLOR/MONOCHROME | TWO-SIDED/ONE-SIDED | | PAGE LAYOUT |
|---|---|---|---|
| ☑ MONOCHROME | ☑ TWO-SIDED | | ☐ 1 in 1 |
| ☐ COLOR | ☐ ONE-SIDED | | ☑ 2 in 1 |
| | | | ☐ 4 in 1 |
| PAPER SIZE | | | ☐ 8 in 1 |
| ☑ A3 | ☑ A4 | | ☐ 16 in 1 |
| ☐ B4 | ☐ B5 | | ☐ 32 in 1 |
| ☐ LETTER | ☐ LEDGER | | |

TRANSMIT SETTING CHANGE — 2001

LOGOUT

JobList1
User: UserA — 2201

| MANAGEMENT NUMBER | REQUESTOR | RECEPTION DATE AND TIME | DOCUMENT NAME | PAPER SIZE | PAGE COUNT | COLOR/ MONOCHROME | Nup | TWO-SIDED/ ONE-SIDED | PRINTING DEADLINE | MESSAGE |
|---|---|---|---|---|---|---|---|---|---|---|
| 1 | UserA | mm/dd/yyyy | ○○○○○○○.doc | A4 | 3 | COLOR | 2 in 1 | TWO-SIDED | mm/dd/yyyy | |
| 2 | UserD | mm/dd/yyyy | ×××××××××××.pdf | A4 | 30 | MONOCHROME | 2 in 1 | ONE-SIDED | mm/dd/yyyy | FOR STRATEGY MEETING |
| 3 | UserC | mm/dd/yyyy | △▽△▼△▽△▼.pdf | A4 | 24 | COLOR | 1 in 1 | TWO-SIDED | mm/dd/yyyy | FOR MT |
| 4 | UserA | mm/dd/yyyy | □□□.txt | A4 | 1 | MONOCHROME | 1 in 1 | ONE-SIDED | mm/dd/yyyy | |
| 5 | UserB | mm/dd/yyyy | ○○●●○○○○●●●.xls | A4 | 15 | MONOCHROME | 1 in 1 | ONE-SIDED | Dec. 31, 2012 | PLEASE PRINT THIS DOCUMENT BEFORE 3 PM MEETING. |

2202 → 2203

JobList1
User: UserA

| MANAGEMENT NUMBER | REQUESTOR | RECEPTION DATE AND TIME | DOCUMENT NAME | PAPER SIZE | PAGE COUNT | COLOR/ MONOCHROME | Nup | TWO-SIDED/ ONE-SIDED | PRINTING DEADLINE | MESSAGE |
|---|---|---|---|---|---|---|---|---|---|---|
| 1 | UserA | mm/dd/yyyy | ○○○○○○○.doc | A4 | 3 | COLOR | 2 in 1 | TWO-SIDED | mm/dd/yyyy | |
| 2 | UserD | mm/dd/yyyy | ×××××××××××.pdf | A4 | 30 | MONOCHROME | 2 in 1 | ONE-SIDED | mm/dd/yyyy | FOR STRATEGY MEETING |
| 3 | UserC | mm/dd/yyyy | △▽△▼△▽△▼.pdf | A4 | 24 | COLOR | 1 in 1 | TWO-SIDED | mm/dd/yyyy | FOR MT |
| 4 | UserA | mm/dd/yyyy | □□□.txt | A4 | 1 | MONOCHROME | 1 in 1 | ONE-SIDED | Dec. 31, 2012 | |

FIG.20

JobList1
User: UserA

| MANAGEMENT NUMBER | REQUESTOR | RECEPTION DATE AND TIME | DOCUMENT NAME | PAPER SIZE | PAGE COUNT | COLOR/ MONOCHROME | Nup | TWO-SIDED/ ONE-SIDED | PRINTING DEADLINE | MESSAGE |
|---|---|---|---|---|---|---|---|---|---|---|
| 1 | UserA | mm/dd/yyyy | OOOOOOOO.doc | A4 | 3 | COLOR | 2 in 1 | TWO-SIDED | mm/dd/yyyy | |
| 2 | UserD | mm/dd/yyyy | xxxxxxxxxxxxx.pdf | A4 | 30 | MONOCHROME | 2 in 1 | ONE-SIDED | mm/dd/yyyy | FOR STRATEGY MEETING |
| 3 | UserC | mm/dd/yyyy | △▽▲▽△▽△▽▲▼.pdf | A4 | 24 | COLOR | 1 in 1 | TWO-SIDED | mm/dd/yyyy | FOR MT |
| 4 | UserA | mm/dd/yyyy | □□□.txt | A4 | 1 | MONOCHROME | 1 in 1 | ONE-SIDED | Dec. 31, 2012 | |
| 5 | UserB | 09:00:00 Aug. 02, 2012 | O●○●○○○○●●○.xls | A4 | 15 | MONOCHROME | 1 in 1 | ONE-SIDED | Dec. 31, 2012 | PLEASE PRINT THIS DOCUMENT BEFORE 3 PM MEETING. |

JobList1
User: UserA

| MANAGEMENT NUMBER | REQUESTOR | RECEPTION DATE AND TIME | DOCUMENT NAME | PAPER SIZE | PAGE COUNT | COLOR/ MONOCHROME | Nup | TWO-SIDED/ ONE-SIDED | PRINTING DEADLINE | MESSAGE |
|---|---|---|---|---|---|---|---|---|---|---|
| 1 | UserA | mm/dd/yyyy | OOOOOOOO.doc | A4 | 3 | COLOR | 2 in 1 | TWO-SIDED | mm/dd/yyyy | |
| 2 | UserD | mm/dd/yyyy | xxxxxxxxxxxxx.pdf | A4 | 30 | MONOCHROME | 2 in 1 | ONE-SIDED | mm/dd/yyyy | FOR STRATEGY MEETING |
| 3 | UserC | mm/dd/yyyy | △▽▲▽△▽△▽▲▼.pdf | A4 | 24 | COLOR | 1 in 1 | TWO-SIDED | mm/dd/yyyy | FOR MT |
| 4 | UserA | mm/dd/yyyy | □□□.txt | A4 | 1 | MONOCHROME | 1 in 1 | ONE-SIDED | Dec. 31, 2012 | |
| 5 | UserB | 09:00:00 Aug. 02, 2012 | O●○●○○○○●●○.xls | A4 | 4 | COLOR | 2 in 1 | TWO-SIDED | Dec. 31, 2012 | PLEASE PRINT THIS DOCUMENT BEFORE 3 PM MEETING. |

SYSTEM, IMAGE FORMING APPARATUS, AND METHOD THEREFOR

BACKGROUND OF THE INVENTION

1. Field of the Invention

The present invention relates to a system which performs control so that an image forming apparatus prints print data obtained by issuing a request to a server.

2. Description of the Related Art

Conventionally, there has been a technique in which an image forming apparatus (for example, a printer) acquires data, such as a document, stored in an apparatus on a network by issuing a request to the apparatus in response to a user instruction, and prints the acquired data.

A conventional printing system is known to charge each department or each user in a company for the cost produced by using an image forming apparatus (for example, a printer). To share the cost impartially, such a printing system is required to check the total number of printed pages recorded for each predetermined period and to acquire tally information for each department or each user based on the unit price and the total number of printed pages.

However, generally, it is not rare for one user to perform printing for other users. There has been a problem that, in this case, the number of printed pages for a plurality of other users is counted as data of one user.

For example, Japanese Patent Application Laid-Open No. 2005-91600 discusses a system in which a print requestor transmits print data and print product user data to an image forming apparatus via a print management apparatus to perform printing, and then the print management apparatus accumulates the print product user data and the number of printed pages as a print history. This system enables counting the number of printed pages for each print product user.

With the technique discussed in Japanese Patent Application Laid-Open No. 2005-91600, the system only reflects print records to each print product user based on the history, and actual printing is performed by the print requestor. Therefore, when printing, the print requestor needs to inquire of each print product user whether printing is permitted and wait for the determination by the print product user, which requires additional time and effort and places a burden on the print requestor. Further, the technique discussed in Japanese Patent Application Laid-Open No. 2005-91600 has a problem that print product users other than the print requestor cannot check the number of pages to be printed for their print products before printing.

SUMMARY OF THE INVENTION

The present invention is directed to a system for enabling a print requestor to easily share print data with other users, and print the print data on an image forming apparatus without effort.

According to an aspect of the present invention, a system includes a server and an image forming apparatus. The server includes a storage unit configured to, for each user, store data corresponding to a document printable by the user in a storage device, a provision unit configured to, according to an instruction from a user, provide a list of the data corresponding to a document printable by the user stored in the storage unit, an addition unit configured to add data selected from the list provided by the provision unit to the storage device as data corresponding to a document printable by another user, and a transmission unit configured to, if the list is provided to the image forming apparatus by the provision unit, transmit to the image forming apparatus print data corresponding to the data selected from the list in response to a request from the image forming apparatus. The image forming apparatus includes a first receiving unit configured to issue a request to the server and then to receive from the server a list of data corresponding to a document printable by a user using the image forming apparatus, a second receiving unit configured to issue a request to the server and then to receive from the server print data corresponding to data selected from the list received by the first receiving unit, and a printing unit configured to print the print data received by the second receiving unit.

Further features of the present invention will become apparent from the following description of exemplary embodiments with reference to the attached drawings.

BRIEF DESCRIPTION OF THE DRAWINGS

FIG. 6 illustrates information of an apparatus user.

FIG. 8 illustrates a job list screen.

FIG. 11 is a flowchart illustrating processing for issuing a print request to another user that is performed by the image forming apparatus.

FIG. 12 illustrates data transmitted from the image forming apparatus to the document management server when a print request is issued.

FIG. 14 illustrates job lists when job addition processing is performed.

FIGS. 17A and 17B illustrate a job list screen and a print setting change screen, respectively.

FIG. 19 illustrates job lists before and after processing for deleting a print job.

FIG. 20 illustrates job lists before and after processing for changing print job settings.

DESCRIPTION OF THE EMBODIMENTS

Various exemplary embodiments, features, and aspects of the invention will be described in detail below with reference to the drawings.

Figure 1:
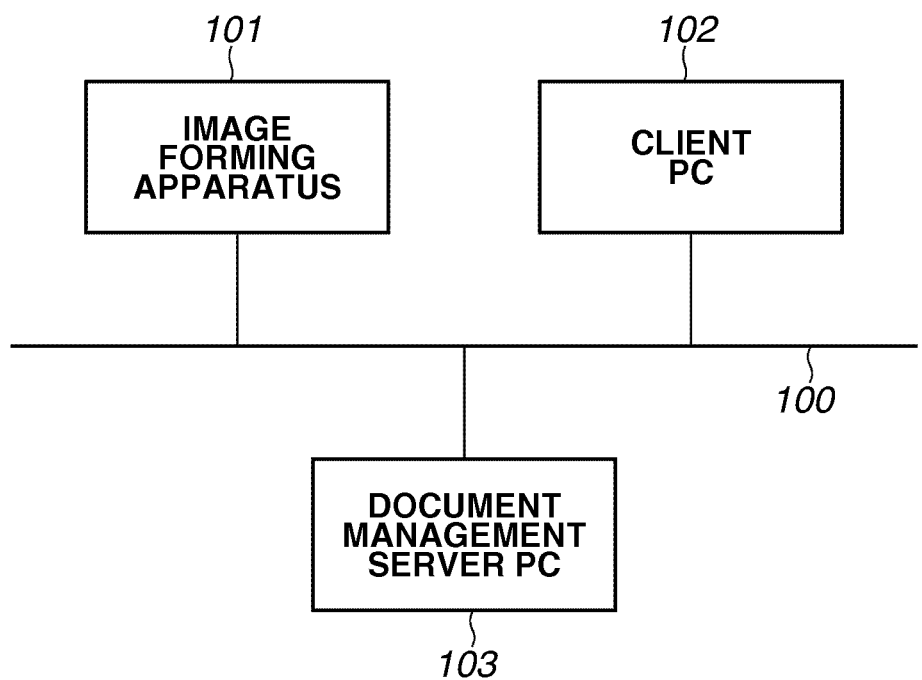
FIG. 1 illustrates a document management system according to a first exemplary embodiment of the present invention.

FIG. 1 illustrates an example of a document management system according to a first exemplary embodiment of the present invention.

Referring to FIG. 1, the document management system includes an image forming apparatus 101. In the present exemplary embodiment, a multifunction peripheral (MFP) having a print function and a scanning function is used as an example of the image forming apparatus 101. However, a single function peripheral (SFP) having only a single function, such as a print function or a scanning function, may also be the image forming apparatus 101.

The document management system includes a client personal computer (PC) 102 and a document management server 103. The image forming apparatus 101, the client PC 102, and the document management server 103 are connected to a network 100, such as a local area network (LAN), so that they can communicate with each other. The client PC 102 has a function of transmitting document information (hereinafter also simply referred to as a document) to the document management server 103. The document management server 103 has a function of temporarily store the document transmitted from the client PC 102. The image forming apparatus 101 has a function of acquiring the document stored in the document management server 103 and printing the document.

Figure 2:
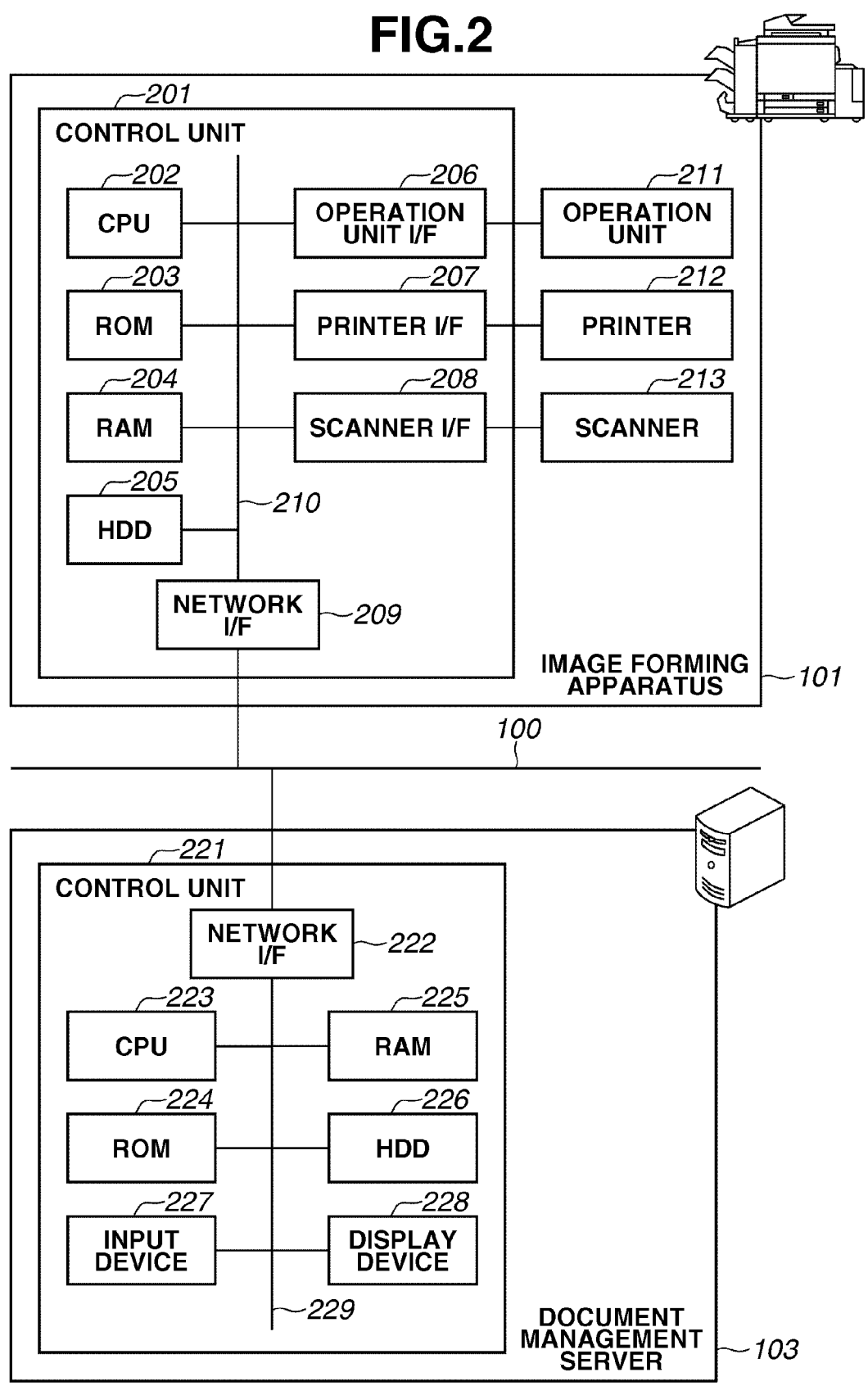
FIG. 2 is a block diagram illustrating a hardware configuration of the document management system.

FIG. 2 is a block diagram illustrating examples of hardware configurations of the image forming apparatus 101 and the document management server 103. In the first exemplary embodiment, the following configurations will be described as examples. However, the first exemplary embodiment is not limited thereto, and applicable to an apparatus capable of performing information communication.

A control configuration of the image forming apparatus 101 will be described below.

In the image forming apparatus 101 illustrated in FIG. 2, a control unit 201 including a central processing unit (CPU) 202 comprehensively controls the image forming apparatus 101. The CPU 202 reads a control program computer-readably stored in a read-only memory (ROM) 203 or a hard disk drive (HDD) 205, and executes various control processing. A random access memory (RAM) 204 is used as a temporary storage area, such as a main memory or a work area for the CPU 202. The HDD 205 stores image data, various programs, or various information tables. The HDD 205 may be other storage devices, such as a solid state drive (SSD).

An operation unit interface (I/F) 206 connects an operation unit 211 and the control unit 201. The operation unit 211 is provided with a display unit (such as a liquid crystal display unit having a touch panel function) and a keyboard. A printer I/F 207 connects a printer 212 and the control unit 201. Image data to be printed by the printer 212 is transferred from the control unit 201 to the printer 212 via the printer I/F 207, and then printed on a recording medium by the printer 212.

A scanner I/F 208 connects a scanner 213 and the control unit 201. The scanner 213 reads an image on a document to generate image data, and transmits the image data to the control unit 201 via the scanner I/F 208. An internal bus 210 is a communication bus for connecting among the CPU 202, the ROM 203, the RAM 204, the HDD 205, the operation unit I/F 206, the printer I/F 207, the scanner I/F 208, and a network I/F 209.

The network I/F 209 is a control unit for transmitting and receiving various information to/from the client PC 102 and the document management server 103 on the network 100. With the above-described configuration of the image forming apparatus 101, when the apparatus is turned on, the CPU 202 initializes the apparatus according to a boot program in the ROM 203, loads an operating system (OS) stored in the HDD 205 and the like, and then activates various applications.

A configuration of the document management server 103 will be described below.

In the document management server 103 illustrated in FIG. 2, a control unit 221 including a CPU 223 comprehensively controls the document management server 103.

The CPU 223 reads a control program computer-readably stored in the ROM 224 or the HDD 226, and executes various control processing. A RAM 225 is used as a temporary storage area, such as a main memory or a work area for the CPU 223. A HDD 226 stores image data, various programs, or various information tables. The HDD 226 may be other storage devices, such as a SSD.

An input device 227 receives a user selection instruction from a keyboard or a mouse, and transmits the instruction to a program via an internal bus 229. A display device 228 is a device for providing information to the user such as a display. The internal bus 229 is a communication bus for connecting among the CPU 223, the RAM 225, the ROM 224, the HDD 226, the input device 227, the display device 228, and a network I/F 222.

The network I/F 222 is a control unit for connecting the control unit 221 to the network 100, and transmitting and receiving various information to/from the image forming apparatus 101 on the network 100. With the above-described configuration of the document management server 103, when the apparatus is turned on, the CPU 223 initializes the apparatus according to a boot program in the ROM 224, loads the OS stored in the HDD 226 and the like, and then activates various applications. The configuration of the client PC 102 is similar to that of the document management server 103, and the description thereof will be omitted.

Figure 3:
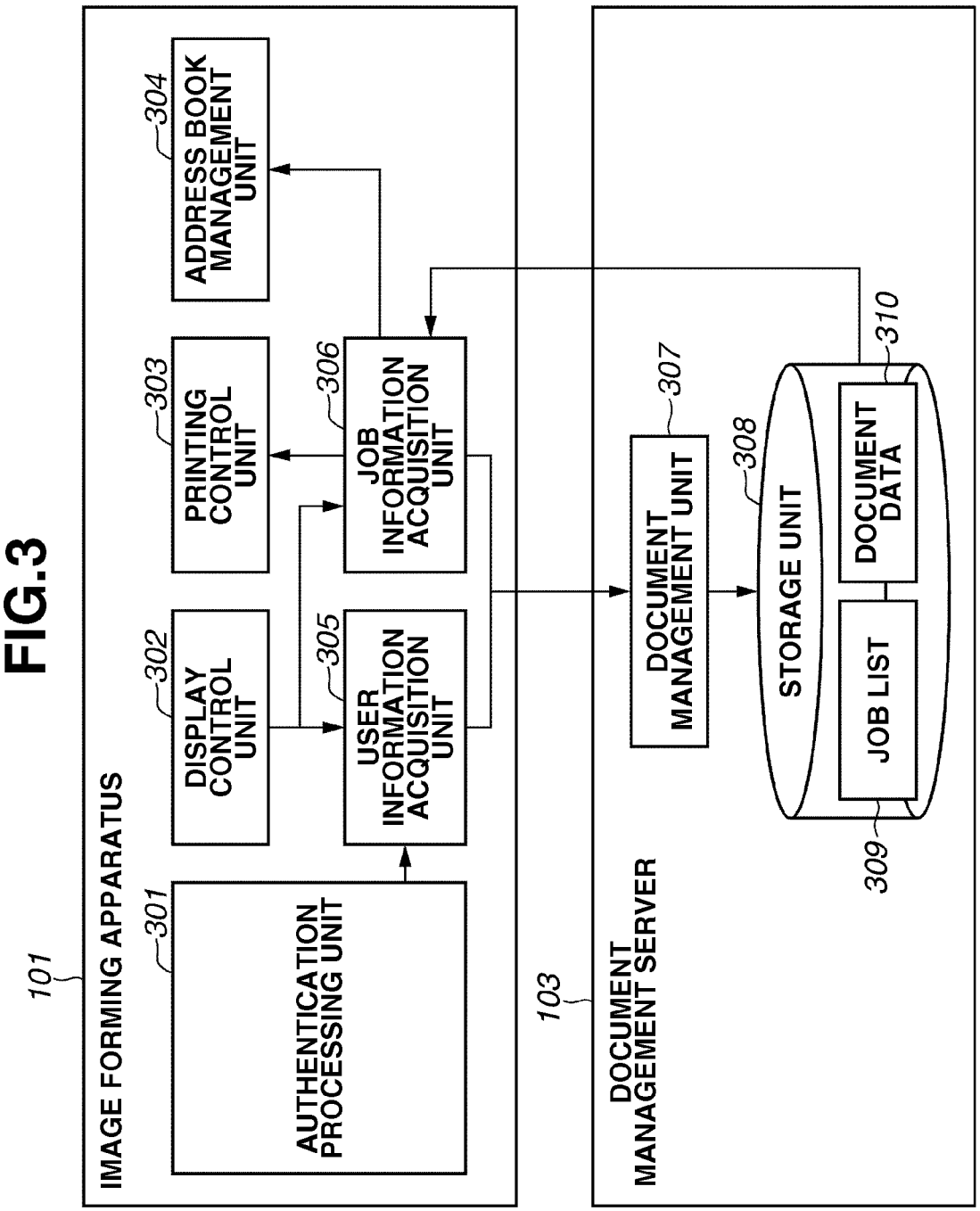
FIG. 3 illustrates a software configuration of the document management system.

FIG. 3 illustrates an example of a software configuration of the document management system according to the first exemplary embodiment.

Referring to the image forming apparatus 101 illustrated in FIG. 3, an authentication processing unit 301 performs authentication of a print job in addition to authentication of a user and a work group. A display control unit 302 displays various information, such as drive conditions, device statuses, and input information, on the display unit (liquid crystal display unit) of the operation unit 211. The display control unit 302 further transmits input information transmitted via the display unit of the operation unit 211 to various driving devices.

A printing control unit 303 performs control to transmit, copy, and store image data. An address book management unit 304 stores and extracts to/from the HDD 205 address data (mail address and facsimile number) constituting the address book, a department ID, login user information, and other device setting information. An user information acquisition unit 305 acquires apparatus user information transmitted via the display control unit 302, and transmits the information to the document management server 103.

A job information acquisition unit 306 acquires history data and a document of a print job, and transmits and receives print data to/from the document management server 103. For example, the job information acquisition unit 306 issues a request to the document management server 103 to receive from the document management server 103 a job list 309 (to be described below) of the user currently using the image forming apparatus 101. Further, the job information acquisition unit 306 issues a request to the document management server 103 to receive from the document management server 103 print data selected from the job list 309 by the user. The printing control unit 303 prints the print data received from the document management server 103. When the printing control unit 303 performs printing, a tally application (not illustrated) counts the number of pages printed in the printing as the number of pages printed by the user currently using the image forming apparatus 101, and stores the result in the HDD 205. The number of printed pages may also be counted and stored by the document management server 103.

Each of the software pieces 301 to 306 of the image forming apparatus 101 is implemented when the CPU 202 of the image forming apparatus 101 executes a relevant program stored in the ROM 203 or the HDD 205.

In the document management server 103 illustrated in FIG. 3, a document management unit 307 manages document data transmitted from the client PC 102 or the job information acquisition unit 306 separately for each piece of user information transmitted from the client PC 102 or the user information acquisition unit 305. If necessary, the document management unit 307 generates a job list for each user by using those pieces of information.

For example, the document management unit 307 stores in a storage unit 308 the document data transmitted from the client PC 102, and manages the document data in association with the user information, such as the user name, transmitted together with the document data. If a job list associated with the user information has already been managed, the document management unit 307 adds the document data to the job list. In some cases, print setting information may be transmitted together with the document data, for example, from the client PC 102.

The storage unit 308 stores and extracts to/from the HDD 226 the job list 309 and document data 310 transmitted from the document management unit 307. The job list 309 exists for each user, and is stored, for example, in the comma-separated value (CSV) file format. The document data 310 is stored in the portable document format (PDF), the tagged image file format (TIFF) and the like. The storage format and data format of the job list 309 and the document data 310 are not limited to specific formats.

For example, in response to a request from the image forming apparatus 101 according to a user instruction, the document management unit 307 transmits the job list 309 of the user to the image forming apparatus 101. Further, in response to a request from the image forming apparatus 101 according to a user instruction, the document management unit 307 transmits to the image forming apparatus 101 the document data selected from the job list 309 on the image forming apparatus 101 as print data. It is assumed here that before the document management unit 307 actually transmits data to the image forming apparatus 101, the document management unit 307 converts the data into a data format suitable for printing. However, when registering a document, the document management unit 307 may convert the document data into a data format for printing and store the data in the storage unit 308 as necessary.

Each of the software pieces 307 to 310 of the document management server 103 is implemented when the CPU 223 of the document management server 103 executes a relevant program stored in the ROM 224 or the HDD 226.

Processing performed by the image forming apparatus 101 and the document management server 103 according to the first exemplary embodiment will be described below.

Figure 4:
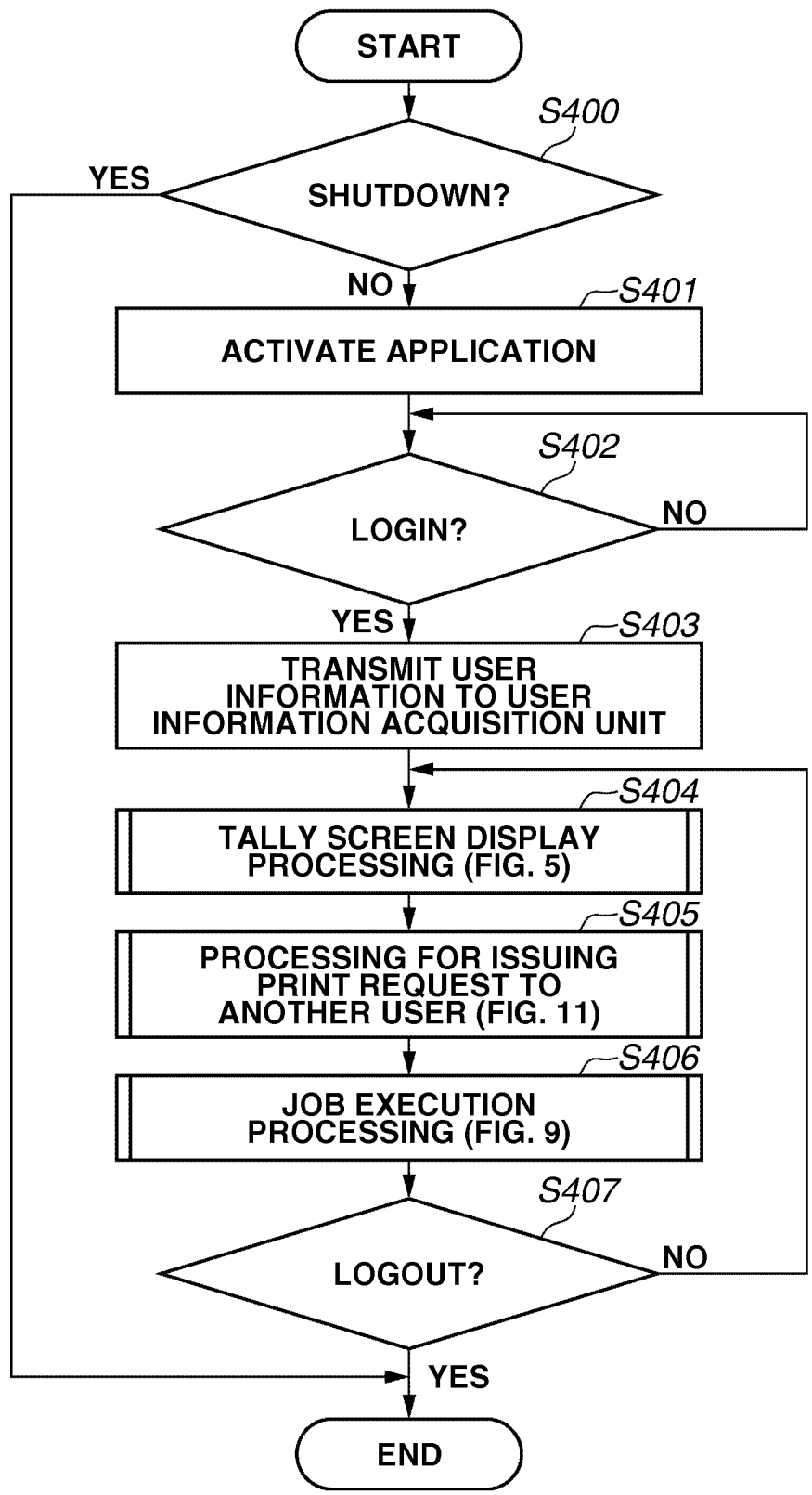
FIG. 4 is a flowchart illustrating processing performed by the image forming apparatus.

FIG. 4 is a flowchart illustrating an example of processing performed by the image forming apparatus 101 in which a document management application and the like are activated according to the first exemplary embodiment. The flowchart illustrated in FIG. 4 includes steps S400 to S407. Processing illustrated in FIG. 4 and processing illustrated in FIGS. 5, 9, and 11 (to be described below) are implemented when the CPU 202 of the image forming apparatus 101 executes a relevant program stored in the ROM 203 or the HDD 205.

In step S400, the image forming apparatus 101 determines whether shutdown is to be performed according to the presence or absence of a relevant instruction via a predetermined screen displayed by the display control unit 302. If the image forming apparatus 101 determines that shutdown is not to be performed (NO in step S400), the processing proceeds to step S401. In step S401, the image forming apparatus 101 activates a tally application and a document management application. The tally application provides a function of obtaining user's printing records or usage tendency during a specific tally period, displaying the information on the display screen, and notifying the user of the information.

In step S402, the authentication processing unit 301 performs processing for logging in. In the login processing, the authentication processing unit 301 determines whether the user information stored in the image forming apparatus 101 matches the input information transmitted from the display control unit 302, or the user information acquired from integrated circuit (IC) card information from a card reader (not illustrated) to perform the login authentication. The user information is prestored in the RAM 204 or an external memory (not illustrated). The user information may be the one managed on a publicly known external authentication server (not illustrated).

If the authentication processing unit 301 determines that the user information stored in the image forming apparatus 101 does not match the input information, etc., and therefore the login authentication has failed (NO in step S402), the authentication processing unit 301 repeats the processing in step S402.

On the other hand, if the authentication processing unit 301 determines that the user information stored in the image forming apparatus 101 matches the input information, etc., and therefore the login authentication has been successfully completed (YES in step S402), the processing proceeds to step S403. In step S403, the authentication processing unit 301 transmits the user information successfully authenticated in step S402 to the user information acquisition unit 305.

In step S404, the display control unit 302 performs tally screen display processing for displaying records of the current login user. The tally screen display processing in step S404 will be described in detail below with reference to FIG. 5.

In the tally screen display processing in step S404, the job list of the current login user illustrated in FIG. 8 (to be described below) can be displayed. The current login user can select a job from this job list, and execute the print job or issue an instruction, such as a print request, to another user.

In step S405, if the current login user issues a print request to another user, the image forming apparatus 101 performs processing for issuing a print request to another user. If a print request is not issued from the login user to another user, the processing in step S405 is skipped. The processing for issuing a print request to another user in step S405 will be described in detail below with reference to FIG. 11.

In step S406, if the current login user issues a print job execution instruction, the image forming apparatus 101 performs processing for executing the selected print job. If a print job execution instruction is not issued from the current login user, the processing in step S406 is skipped. The job execution processing in step S406 will be described in detail below with reference to FIG. 9.

In step S407, the display control unit 302 determines the presence or absence of a logout notification based on a relevant instruction via a predetermined screen. During the processing in steps S404 to S406, the image forming apparatus 101 is ready to receive a logout instruction from the user via a screen displayed on the display control unit 302. Upon reception of a logout notification, the processing immediately proceeds to step S407. If the display control unit 302 determines that a logout notification has not been issued (NO in step S407), the processing returns to step S404.

On the other hand, if the display control unit 302 determines that a logout notification has been issued (YES in step S407), the processing illustrated in this flowchart is ended.

Figure 5:
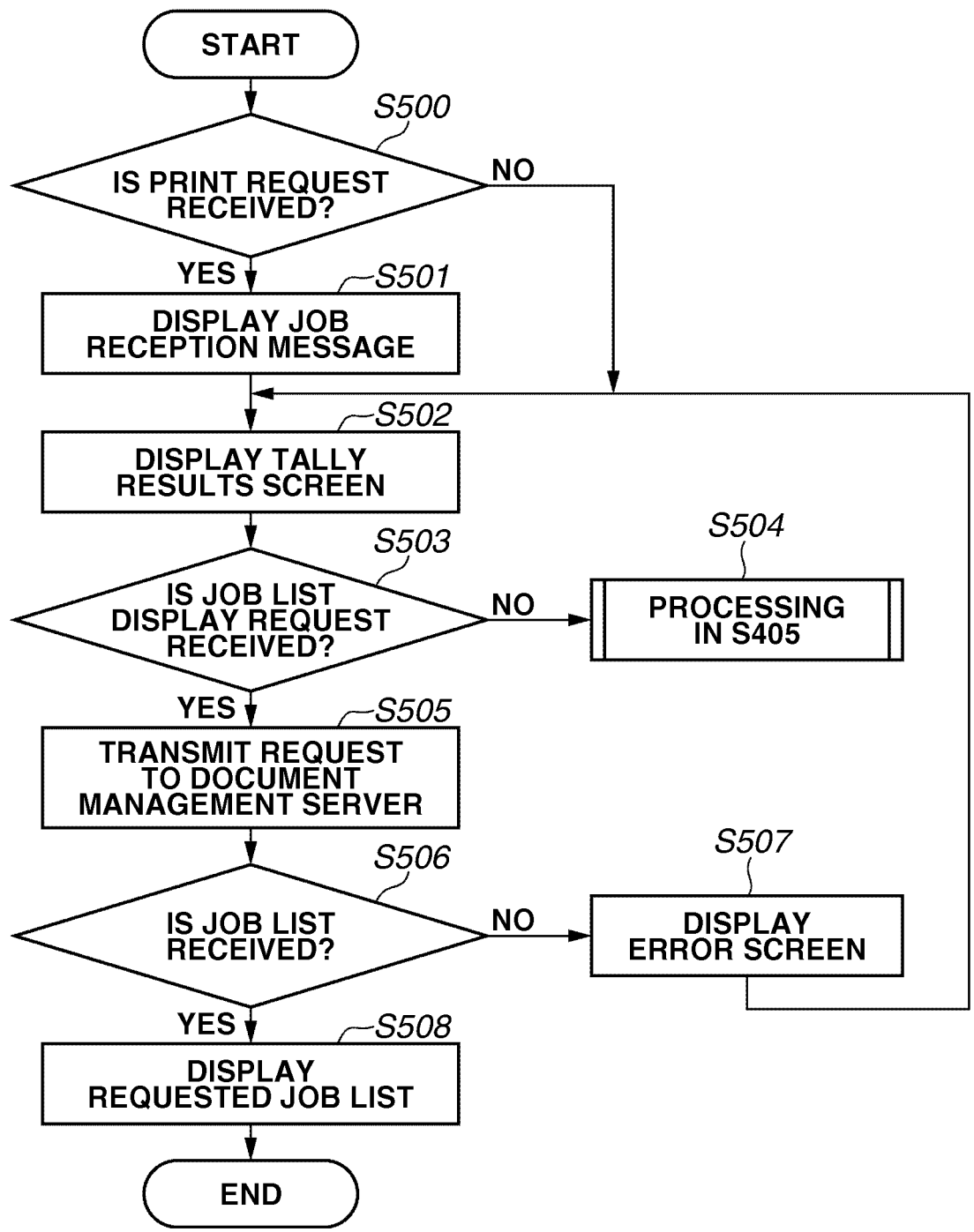
FIG. 5 is a flowchart illustrating details of processing for displaying a tally screen that is performed by the image forming apparatus.

FIG. 5 is a flowchart illustrating details of the tally screen display processing in step S404 illustrated in FIG. 4. The flowchart illustrated in FIG. 5 includes steps S500 to S508.

In step S500, the user information acquisition unit 305 determines whether a new print request has been received. To make this determination, the user information acquisition unit 305 first transmits information about the current login user to the document management server 103 on the network 100 via the network I/F 209, and then receives updated information of the job list of the user from the document management server 103, and analyzes whether a new print request is included in the updated information.

FIG. 6 illustrates an example of information transmitted from the image forming apparatus 101 to the document management server 103 for acquiring the updated information from the document management server 103. As illustrated in FIG. 6, the information includes the name of the user of the image forming apparatus 101, the date and time of last login, and the remaining job at the time of last login. The data format of this information is not limited to a certain format and may be, for example, extended markup language (XML), JavaScript Object Notation (JSON), and CSV. A method for checking the update of the job list by the document management server 103 will be described below.

If the user information acquisition unit 305 determines that a new print request has not been received (NO in step S500), the processing proceeds to step S502.

On the other hand, if the user information acquisition unit 305 determines that a new print request has been received (YES in step S500), the processing proceeds to step S501. In step S501, the display control unit 302 displays a message screen 700 illustrated in FIG. 7A on the display unit of the operation unit 211 based on the updated information received in step S500. In step S502, the display control unit 302 displays a tally screen 800 illustrated in FIG. 7B on the display unit of the operation unit 211 based on the tally result by the tally application.

Figure 7A:
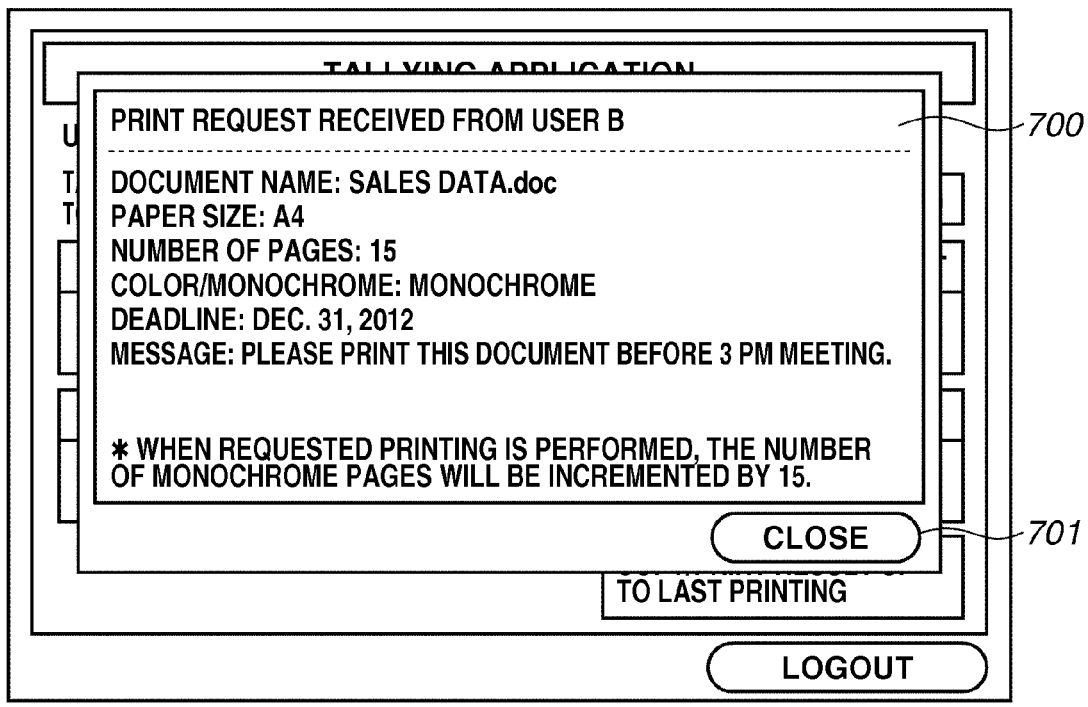
FIGS. 7A and 7B illustrate a message screen and a tally results screen, respectively.

The message screen 700 illustrated in FIG. 7A displays a message indicating the reception of a new print request due to a print request issued by a user different from the current login user to the current login user. This print request is generated when print data of another user is copied to the job list of the current login user managed by the document management server 103. This message includes print settings (for example, paper size and color setting) set for the new print job and the number of pages to be printed. The contents of the message can be suitably changed according to the display environment of a notification destination. For example, the message may include only print requestor information and the number of pages to be printed.

Referring to FIG. 7A, the message screen 700 includes a close button 701. When the close button 701 is pressed, the display control unit 302 closes the message screen 700 and the processing proceeds to step S502. In step S502, the display control unit 302 displays the tally screen 800 illustrated in FIG. 7B.

Figure 7B:
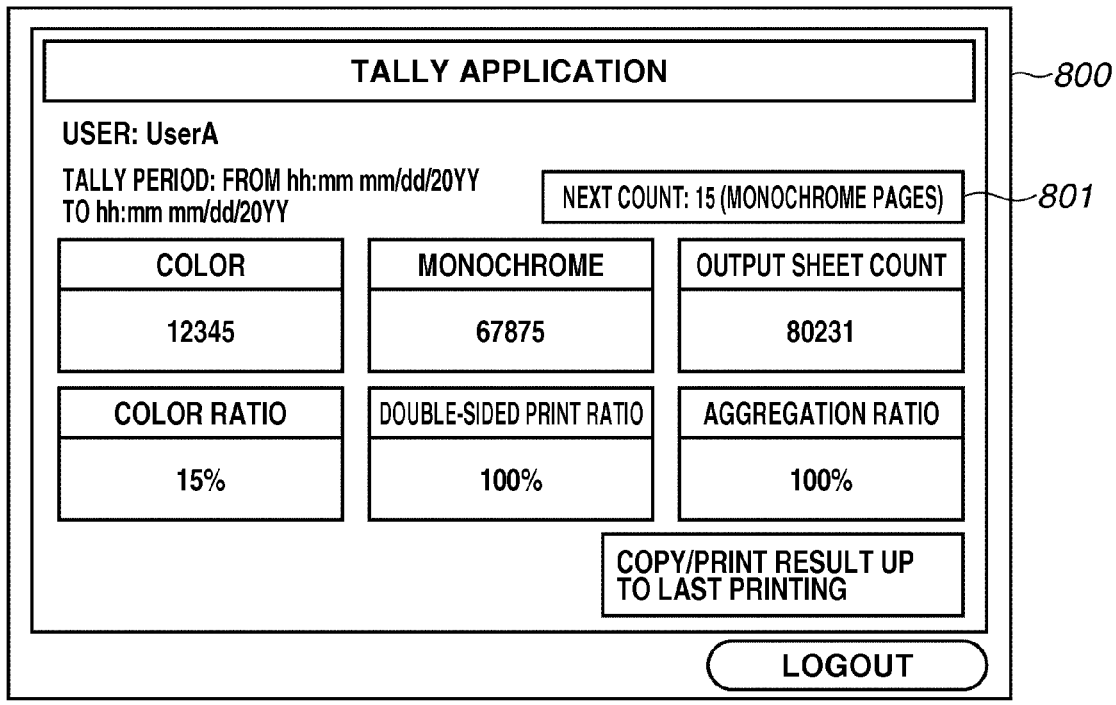

As illustrated in FIG. 7B, the tally screen 800 includes the tally results for each tally item, the copy/print result up to last printing button, the logout button, and a next count button 801. The next count button 801 indicates the total number of pages to be printed when an unexecuted print job included in the job list is executed. By pressing the next count button 801, the job list of the current login user (hereinafter referred to as a job list U) illustrated in FIG. 8 can be displayed. Pressing the next count button 801 transmits a job list display request to the display control unit 302. The screens illustrated in FIGS. 7A and 7B are simply used as examples, and the message screen and the tally screen may be different from these examples.

In step S503, the display control unit 302 determines whether a job list display request has been issued by the current login user (whether the next count button 801 has been pressed by the current login user). If the display control unit 302 determines that a job list display request has not been issued (NO in step S503), then in step S504, the processing proceeds to step S405 illustrated in FIG. 4. On the other hand, if the display control unit 302 determines that a job list display request has been issued (YES in step S503), the processing proceeds to step S505.

In step S505, the user information acquisition unit 305 transmits the job list request to the document management server 103 on the network 100 via the network I/F 209.

In step S506, the user information acquisition unit 305 determines whether the job list of the user has been received from the document management server 103. If the user information acquisition unit 305 determines that the job list of the user has not been received for a predetermined period of time (NO in step S506), the proceeding proceeds to step S507. In step S507, the display control unit 302 displays an error message screen on the display unit, and the processing returns to step S502.

On the other hand, if the user information acquisition unit 305 determines that the job list of the user has been received (YES in step S506), the processing proceeds to step S508. In step S508, the display control unit 302 displays on the display unit a job list screen 900 including the received job list, and ends the tally screen display processing in step S404 illustrated in FIG. 4.

FIG. 8 illustrates an example of the job list screen 900 displayed on the display unit in step S508 illustrated in FIG. 5 according to the first exemplary embodiment.

Figure 9:
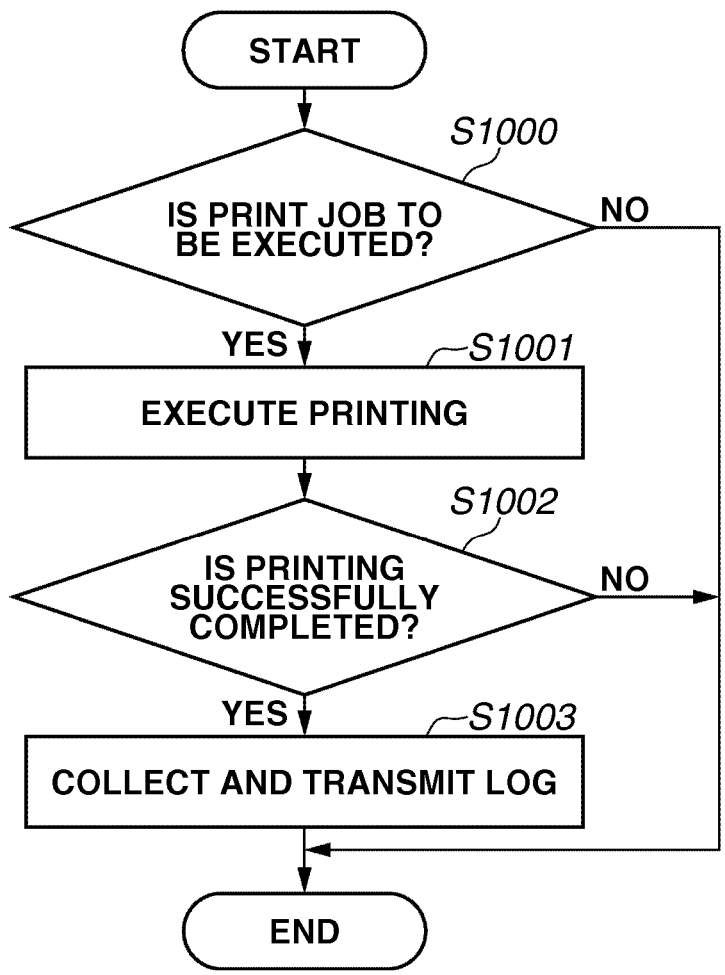
FIG. 9 is a flowchart illustrating job execution processing performed by the image forming apparatus.

As illustrated in FIG. 8, the job list screen 900 displays a list of print jobs registered in the job list of the current login user of the image forming apparatus 101. Information about each print job includes the print requestor, the document name, and the date and time of update. The user checks a check box 901 to select a job from the job list. Then, when the user presses a print button 902, the image forming apparatus 101 is instructed to execute the print job, and the job execution processing illustrated in FIG. 9 is executed. With this job execution processing, the image forming apparatus 101 can issue a print request to the document management server 103, acquire print data corresponding to the selected print job, and print the print data.

When the user presses a display tally results screen button 905, the display control unit 302 closes the job list screen 900, and displays the tally screen 800 illustrated in FIG. 7B. Processing performed when the user presses a print request to other user button 904 for issuing a print request to another user different from the user will be described below. Further, processing performed when the user presses a delete button 903 will be described below in a second exemplary embodiment of the present invention. The screen illustrated in FIG. 8 is simply used as an example, and the job list screen may have a different screen configuration from that in the example.

Next, the job execution processing in step S406 illustrated in FIG. 4 will be described with reference to FIG. 9.

FIG. 9 is a flowchart illustrating an example of the job execution processing in step S406 illustrated in FIG. 4. The flowchart illustrated in FIG. 9 includes steps S1000 to S1003.

In step S1000, the print control unit 303 determines whether a print job execution request has been received from the job list screen 900 via the display control unit 302. If the print control unit 303 determines that a print job execution request has not been received (NO in step S1000), the print control unit 303 ends the job execution processing in step S406 illustrated in FIG. 4.

On the other hand, If the print control unit 303 determines that a print job execution request has been received (YES in step S1000), the processing proceeds to step S1001. In step S1001, the print control unit 303 transmits a print request corresponding to the print job execution request to the document management server 103 via the job information acquisition unit 306. Then, the print control unit 303 acquires from the document data 310 in the storage unit 308 of the document management server 103 print data for printing the document data corresponding to the print request, and executes print processing.

In step S1002, the print control unit 303 determines whether printing has been successfully completed. If the print control unit 303 determines that printing has been successfully completed (YES in step S1002), the processing proceeds to step S1003. In step S1003, the job information acquisition unit 306 collects history data (log) of the print job, and transmits the collected history data to the tally application. According to this information, the tally application counts the number of printed pages for each user, and stores the results. Upon completion of the processing in step S1003, the print control unit 303 ends the job execution processing in step S405 illustrated in FIG. 4.

On the other hand, if the print control unit 303 determines that printing has failed (NO in step S1002), the print control unit 303 ends the job execution processing in step S405 illustrated in FIG. 4.

Figure 10:
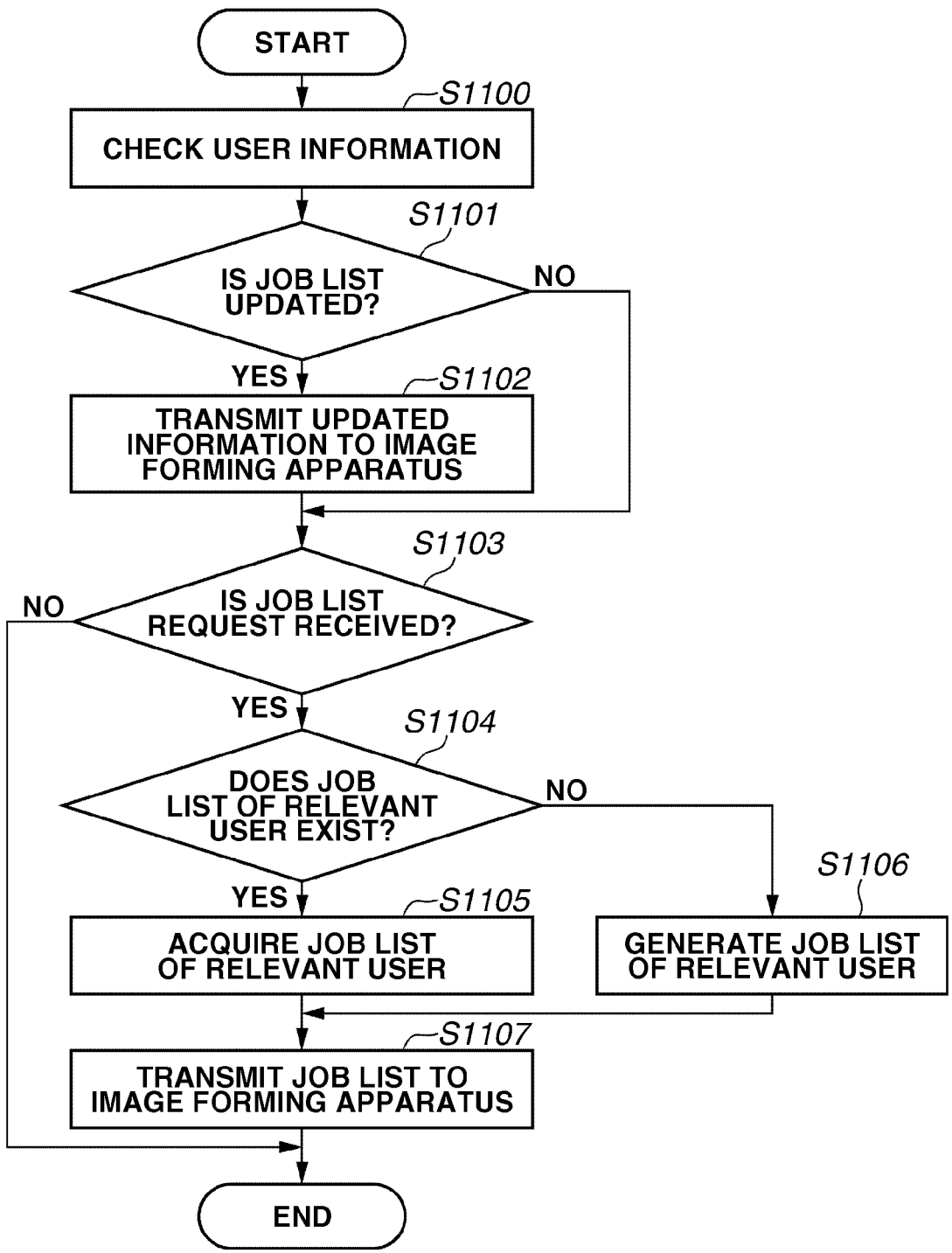
FIG. 10 is a flowchart illustrating processing performed by the document management server.

FIG. 10 is a flowchart illustrating an example of processing performed when the document management server 103 has received user information from the image forming apparatus 101. The flowchart illustrated in FIG. 10 includes steps S1100 to S1107. Processing illustrated in FIG. 10 and processing illustrated in FIG. 13 (to be described below) are implemented when the CPU 223 of the document management server 103 executes a relevant program stored in the ROM 224 or the HDD 226.

In step S1100, the document management unit 307 checks the user information received via the network I/F 222. This user information is as illustrated in FIG. 6, and corresponds to the user information transmitted in step S403 illustrated in FIG. 4.

In step S1101, the document management unit 307 determines whether the job list of the user corresponding to the user information checked in step S1100 has been updated. To make this determination, the document management unit 307 compares the date and time of last login and the user name included in the user information with the date and time of latest reception and the print requestor name included in the job list, respectively. If the date and time of latest reception of the job included in the job list is newer than the date and time of last login included in the user information and if the user name included in the user information differs from the print requestor name of the job included in the job list, the document management unit 307 determines that the job list of the user corresponding to the user information has been updated.

If the document management unit 307 determines that the job list has been updated (YES in step S1101), the processing proceeds to step S1102. In step S1102, the document management unit 307 transmits the updated information of the job list to the image forming apparatus 101 on the network 100 via the network I/F 222, and the processing proceeds to step S1103. The updated information of the job list transmitted at this time corresponds to the updated information received in step S500 in FIG. 5.

On the other hand, If the document management unit 307 determines that the job list has not been updated (NO in step S1101), the processing proceeds to step S1103.

In step S1103, the document management unit 307 determines whether a job list request has been received from the image forming apparatus 101. This job list request corresponds to the job list request transmitted in step S505 illustrated in FIG. 5. If the document management unit 307 determines that a job list request has not been received (NO in step S1103), the document management unit 307 ends the processing in this flowchart.

On the other hand, if the document management unit 307 determines that a job list request has been received (YES in step S1103), the processing proceeds to step S1104. In step S1104, the document management unit 307 determines whether a job list of the user corresponding to the user information exists in the storage unit 308.

If the document management unit 307 determines that a job list of the user corresponding to the user information exists (YES in step S1104), the processing proceeds to step S1105. In step S1105, the document management unit 307 acquires the job list of the user corresponding to the user information, and the processing proceeds to step S1107.

On the other hand, if the document management unit 307 determines that the job list of the user corresponding to the user information does not exist (NO in step S1104), the processing proceeds to step S1106. In step S1106, the document management unit 307 generates a job list of the user corresponding to the user information based on the user information and the document data 310 stored in the storage unit 308, and stores the job list in the storage unit 308, and the processing proceeds to step S1107.

In step S1107, the document management unit 307 transmits the job list of the user corresponding to the user information to the image forming apparatus 101 on the network 100 via the network I/F 222. The job list transmitted at this time corresponds to the job list received in step S506 illustrated in FIG. 5.

When the current login user of the image forming apparatus 101 checks the check box 901 of the job selected from the transmitted job list, and then presses the print button 902, a print request for the selected job is transmitted from the user information acquisition unit 305 to the document management server 103. In the document management server 103, in response to the print request, the document management unit 307 transmits print data corresponding to the job selected from the job list to the job information acquisition unit 306 of the image forming apparatus 101. This print data is received and printed in step S1001 illustrated in FIG. 9.

FIG. 11 is a flowchart illustrating details of the processing for issuing a print request to another user in step S405 illustrated in FIG. 4. The flowchart illustrated in FIG. 11 includes steps S1300 to S1307.

In step S1300, the display control unit 302 determines whether a print request for a job existing in the job list of the print requestor (hereinafter referred to as a job list R) has been issued to another user. To make this determination, the display control unit 302 determines whether after any one of the check boxes 901 of the job list screen 900 illustrated in FIG. 8 is selected, the print request to other user button 904 for issuing a print request to another user has been pressed.

If the display control unit 302 determines that a print request has not been issued to another user (NO in step S1300), the CPU 202 ends the processing for issuing a print request to another user in step S405.

On the other hand, if the display control unit 302 determines that a print request has been issued to another user (YES in step S1300), the processing proceeds to step S1301. In step S1301, the address book management unit 304 acquires an address book including the apparatus user's destination information from the HDD 205, and displays the address book on the display unit 216. The display control unit 302 receives, from the apparatus user, information about selection of another user with whom a job of the current login user registered in the document management server 103 is to be shared. In this selection, a plurality of users can be selected. At this time, the display control unit 302 performs control to allow the current login user to input a message to the selected other user, and specify a deadline until which the selected other user can print information of the job selected in step S1300.

In step S1302, the display control unit 302 determines whether the information of another user (print request destination user) different from the current login user has been selected by the current login user. If the display control unit 302 determines that the information of another user has not been selected (NO in step S1302), the processing returns to step S1301.

On the other hand, if the display control unit 302 determines that the information of another user has been selected (YES in step S1302), the processing proceeds to step S1303. In step S1303, the user information acquisition unit 305 transmits data including the information of the job selected in step S1300, the information of the current login user, and the information of another user selected in step S1302 to the document management server 103 on the network 100 via the network I/F 209 as print request job information. Specifically, the user information acquisition unit 305 transmits the data illustrated in FIG. 12 to the document management server 103 so that the specified other user can print the job selected from the job list screen 900 by the user.

FIG. 12 illustrates an example of data transmitted to the document management server 103 in step S1303 illustrated in FIG. 11.

As illustrated in FIG. 12, when issuing a print request to another user, the image forming apparatus 101 transmits, for example, the following data to the document management server 103: the user name of the print requestor, the department ID of the print requestor, the name of another user who has been requested to perform printing, the department ID of another user who has been requested to perform printing, the date and time of print request, the document name of the print request job, print setting information including the paper size, the page count, and the color/monochrome setting, and other information including the printing deadline for another user requested to perform printing, and a message to another user requested to perform printing. The data format of the above data is not limited to a certain format and may be, for example, XML, JSON, and CSV.

In step S1304, the user information acquisition unit 305 determines whether the data transmission to the document management server 103 in step S1303 has been successfully completed. If the user information acquisition unit 305 determines that the data transmission to the document management server 103 has failed (NO in step S1304), the processing proceeds to step S1307.

On the other hand, if the user information acquisition unit 305 determines that the data transmission to the document management server 103 has been successfully completed (YES in step S1304), the processing proceeds to step S1305. In step S1305, the image forming apparatus 101 transmits a print request message to another user, who is the print request destination user selected in step S1302, by email, etc. A method of the notification is not limited to a specific method.

In step S1306, the image forming apparatus 101 determines whether the notification in step S1305 has been successfully completed. If the image forming apparatus 101 determines that the notification has failed (NO in step S1306), the processing proceeds to step S1307. In step S1307, the display control unit 302 displays an error message (a transmission failure message in step S1303 or a notification failure message in step S1305) on the display unit of the operation unit 211, and ends the processing for issuing a print request to another user in step S405.

On the other hand, if the image forming apparatus 101 determines that the notification has been successfully completed (YES in step S1306), the display control unit 302 ends the processing for issuing a print request to another user in step S405.

Figure 13:
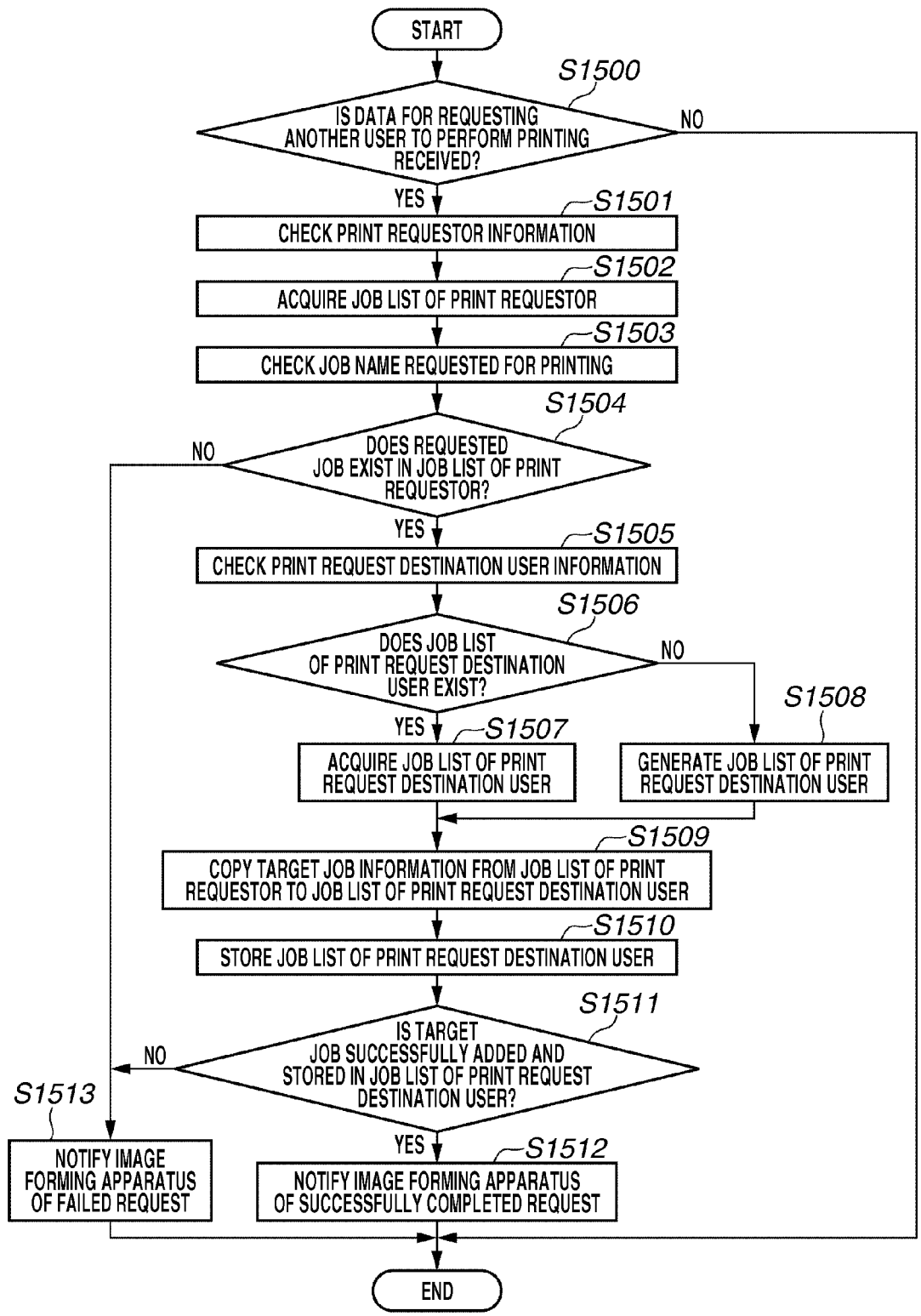
FIG. 13 is a flowchart illustrating processing performed by the document management server.

FIG. 13 is a flowchart illustrating an example of processing performed when the document management server 103 receives from the image forming apparatus 101 data for requesting another user to perform printing. The flowchart illustrated in FIG. 13 includes steps S1500 to S1513.

In step S1500, the document management unit 307 determines whether the data for requesting another user to perform printing illustrated in FIG. 12 has been received from the image forming apparatus 101 via the network I/F 222. If the document management unit 307 determines that the data for requesting another user to perform printing has not been received (NO in step S1500), the document management unit 307 ends the processing in this flowchart.

On the other hand, if the document management unit 307 determines that the data for requesting another user to perform printing has been received (YES in step S1500), the processing proceeds to step S1501. In step S1501, the document management unit 307 checks information of the print requestor from the data received in step S1500. For example, in the data items illustrated in FIG. 12, the document management unit 307 checks information corresponding to the print requestor name.

In step S1502, the document management unit 307 acquires from the storage unit 308 the job list of the user corresponding to the information of the print requestor checked in step S1501. In step S1503, the document management unit 307 checks the name of the job requested for printing from the data received in step S1500. For example, in the data items illustrated in FIG. 12, the document management unit 307 checks the document name of the print request job.

In step S1504, the document management unit 307 determines whether the job corresponding to the job name checked in step S1503 exists in the job list acquired in step S1502.

If the document management unit 307 determines that the job corresponding to the job name requested for printing does not exist in the job list (NO in step S1504), the processing proceeds to step S1513. In step S1513, the document management unit 307 transmits a notification that the request has failed to the image forming apparatus 101 on the network 100 via the network I/F 222.

On the other hand, if the document management unit 307 determines that the job corresponding to the job name requested for printing exists in the job list (YES in step S1504), the processing proceeds to step S1505. In step S1505, the document management unit 307 checks information of the print request destination user indicating the information of another user requested to perform printing from the data received in step S1500.

In step S1506, the document management unit 307 determines whether a job list of the user corresponding to the information of the print request destination user checked in step S1505 exists in the storage unit 308. If the document management unit 307 determines that a job list of the user corresponding to the information of the print request destination user exists (YES in step S1506), the processing proceeds to step S1507. In step S1507, the document management unit 307 acquires the job list corresponding to the print request destination user, and the processing proceeds to step S1509.

On the other hand, If the document management unit 307 determines that a job list of the user corresponding to the information of the print request destination user does not exist (NO in step S1506), the document management unit 307 advances the processing to step S1508.

In step S1508, the document management unit 307 generates a job list corresponding to the print request destination user, and stores the job list in the storage unit 308, and the processing proceeds to step S1509.

In step S1509, based on the data received in step S1500, the document management unit 307 adds information of the target job in the job list of the print requestor, which is determined to exist in step S1504, to the job list of the print request destination user that has been acquired in step S1507 or generated in step S1508. FIG. 14 illustrates an example of the job list of the print requestor and an example of the job list U of the print request destination user when the processing for adding the information of the target job to the job list of the print request destination user is executed in step S1509.

FIG. 14 illustrates a print requestor's job list 1601. As illustrated in FIG. 14, four jobs having the management numbers 1 to 4 are registered in the print requestor's job list 1601. The requestor, the date and time of reception, the document name, the paper size, the page count, the color/monochrome setting, the printing deadline, and the message information are stored for each job. FIG. 14 also illustrates a print request destination user's job list 1602. In the example illustrated in FIG. 14, a job 1603 of the management number 4 in the print requestor's job list 1601 has been copied and added to the print request destination user's job list 1602 as a job 1604 of the management number 5. At this time, the document management unit 307 changes the reception date and time to the current date and time, and then adds the job 1603 to the print request destination user's job list 1602. The configuration illustrated in FIG. 14 is simply used as an example, and the job list configuration may be different from the example.

In step S1510, the document management unit 307 stores in the storage unit 308 the job list of the print request destination user to which the information of the print request job has been copied in step S1509. If the print request destination user logs into the image forming apparatus 101 and requests a job list, the job list of the print request destination user stored in step S1510 is transmitted to the image forming apparatus 101 (step S1107 illustrated in FIG. 10) and received by the image forming apparatus 101 (step S506 illustrated in FIG. 5). If a plurality of print request destination users is specified, the document management unit 307 executes the processing in steps S1506 to S1510 for each of the print request destination users.

In step S1511, the document management unit 307 determines whether the processing for adding and storing the print request job in the job list of the print request destination user has been successfully completed. If the document management unit 307 determines that the processing for adding and storing the print request job in the job list of the print request destination user has been successfully completed (YES in step S1511), the processing proceeds to step S1512. In step S1512, the document management unit 307 transmits a notification that the print request has successfully been completed to the image forming apparatus 101 on the network 100 via the network I/F 222, and the processing in this flowchart is ended.

On the other hand, if the document management unit 307 determines that the processing for at least either adding or storing the print request job in the job list of the print request destination user has failed (NO in step S1511), the processing proceeds to step S1513. In step S1513, the document management unit 307 transmits a notification that the print request has failed to the image forming apparatus 101 on the network 100 via the network I/F 222, and the processing in this flowchart is ended. If a plurality of print request destination users is specified, in the steps S1511 to S1513, the document management unit 307 transmits a notification that the print request has successfully been completed or has failed so that each of the specified print request destination users can recognize the result.

Through the above-described processing, when the print requestor simply issues a print request by specifying a job of the print requestor and another user, another user requested to perform printing actually performs printing. This makes it unnecessary for the print requestor to wait for an image output permission from another user as in conventional cases, reducing the burden on the print requestor. The user requested to perform printing can execute the requested print job at any desired timing. Further, the user requested to perform printing can check, before printing execution, the number of pages to be counted by executing the print job requested by the print requestor. This makes it unnecessary for the user to request printing as in conventional cases, and enables the user to easily share with another user the print data of the print requestor managed by the document management server 103, and to print the data on the image forming apparatus 101 without effort.

According to the first exemplary embodiment, a print request job is copied from the job list of the user who has issued a print request to another user to the job list of the user who has been requested to perform printing, and the user requested to perform printing is notified of the presence of a print request job. In the first exemplary embodiment, however, a change to print settings by the user requested to perform printing is not taken into consideration. In the tally application, an upper limit value and a target value are set for the number of printed pages and the amount of cost in many cases. Therefore, if printing is simply performed according to the requested print settings, the upper limit value or the target value set for printing by the user requested to perform printing may possibly be exceeded.

In a second exemplary embodiment of the present invention, the user requested to perform printing can voluntarily change the print settings according to the upper limit value and the target value set for the user. For the same elements as those in the first exemplary embodiment, the description thereof will be omitted. Only elements different from those in the first exemplary embodiment will be described below.

Figure 15:
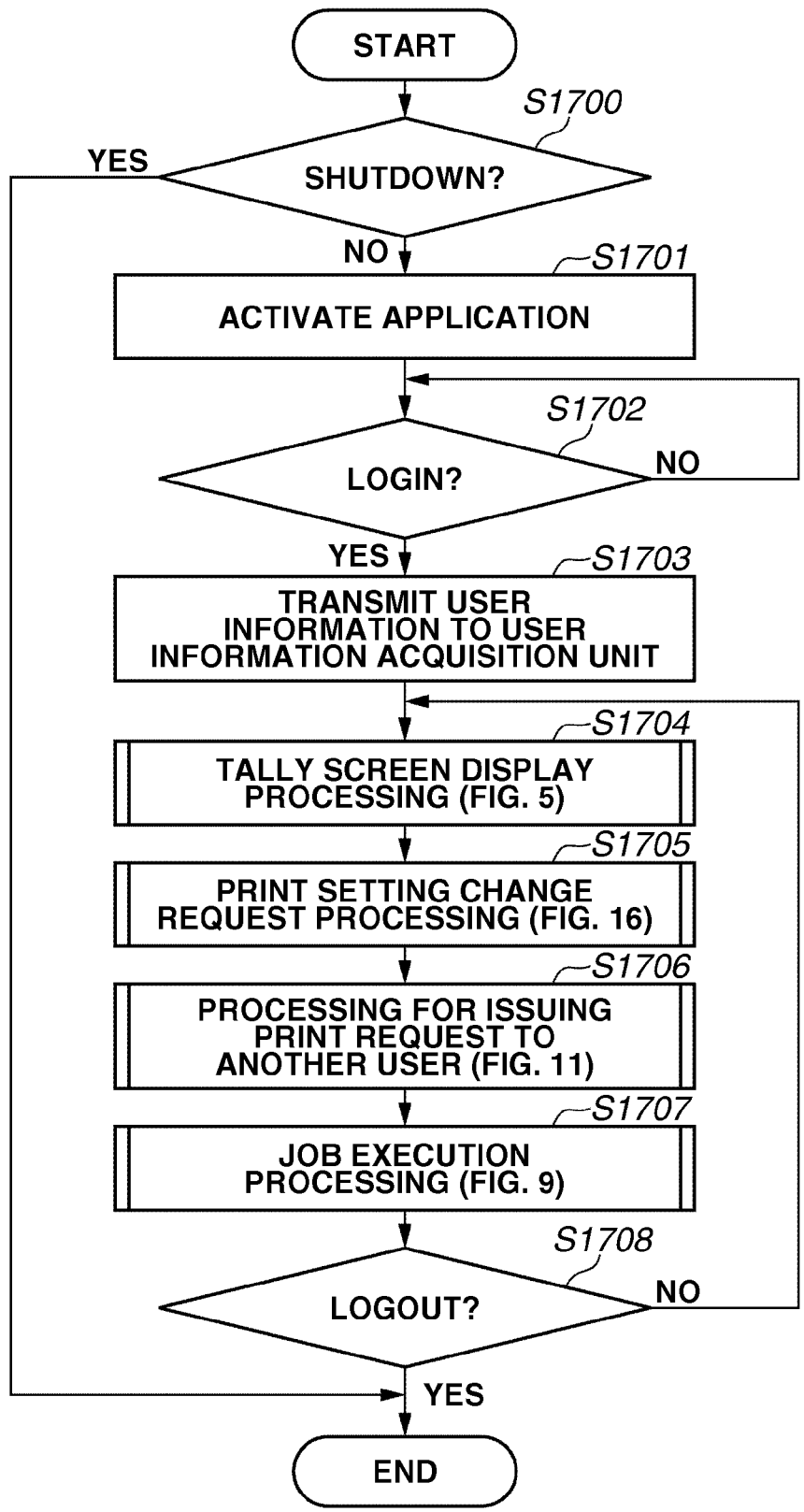
FIG. 15 is a flowchart illustrating processing performed by the image forming apparatus.

FIG. 15 is a flowchart illustrating an example of processing performed by the image forming apparatus 101 in which a document management application and the like are activated according to the second exemplary embodiment. The flowchart illustrated in FIG. 15 includes steps S1700 to S1708. Processing illustrated in FIG. 15 and the processing illustrated in FIG. 16 (to be described below) are implemented when the CPU 202 of the image forming apparatus 101 executes a relevant program stored in the ROM 203 or the HDD 205.

In the processing illustrated in FIG. 15, print setting change request processing in step S1705 is added between steps S404 and S405 in FIG. 4. Processing in steps S1700 to S1704 is similar to the processing in steps S400 to S404 illustrated in FIG. 4, and processing in steps S1706 to S1708 is similar to the processing in steps S405 to S407 illustrated in FIG. 4, and therefore the description thereof will be omitted.

In step S1705, if a print setting change instruction or a job deletion instruction is issued by the current login user, the display control unit 302 performs the print setting change request processing. If a print setting change instruction or a job deletion instruction is not issued by the current login user, the processing in step S1705 is skipped.

Figure 16:
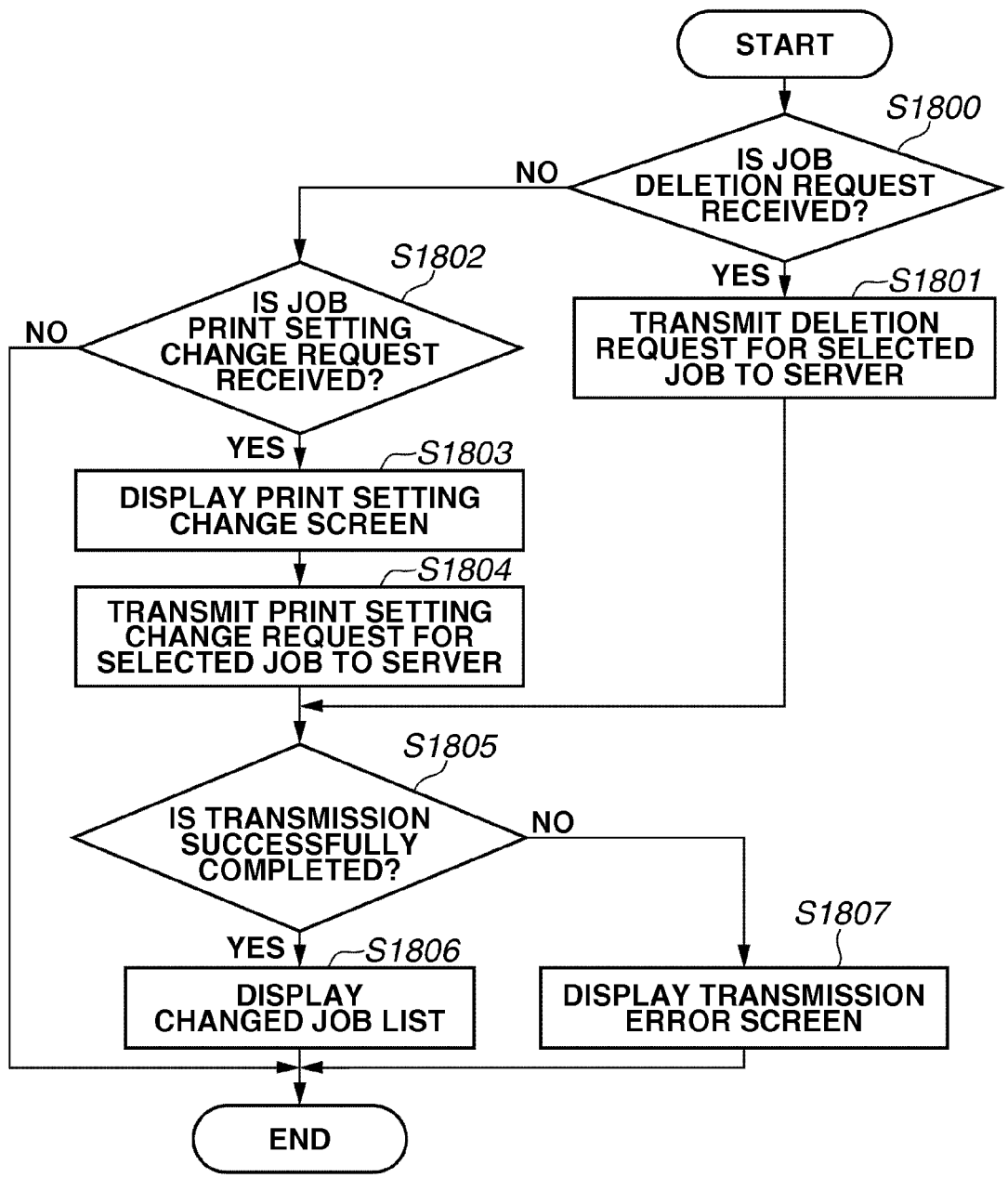
FIG. 16 is a flowchart illustrating processing for issuing a request to change print settings that is performed by the image forming apparatus.

FIG. 16 is a flowchart illustrating details of the print setting change request processing in step S1705 illustrated in FIG. 15. The flowchart illustrated in FIG. 16 includes steps S1800 to S1807.

FIG. 17A illustrates an example of the job list screen 900 according to the second exemplary embodiment.

In step S1800, the display control unit 302 determines whether a job deletion request has been issued by the current login user of the image forming apparatus 101. To make this determination, the display control unit 302 determines whether after any one of the check boxes 901 of the job list screen 900 illustrated in FIG. 17A is selected, the delete button 903 has been pressed.

If the display control unit 302 determines that a job deletion request has been issued (YES in step S1800), the processing proceeds to the step S1801. In step S1801, the job information acquisition unit 306 transmits a request for deleting the job selected in step S1800 to the document management server 103 on the network 100 via the network I/F 209, and the processing proceeds to step S1805.

On the other hand, If the display control unit 302 determines that a job deletion request has not been issued (NO in step S1800), the processing proceeds to step S1802. In step S1802, the display control unit 302 determines whether a job print setting change request has been issued by the current login user of the image forming apparatus 101. To make this determination, the display control unit 302 determines whether after any one of the check boxes 901 of the job list screen 900 illustrated in FIG. 17A is selected, a change settings button 1901 has been pressed.

If the display control unit 302 determines that a job print setting change request has not been issued (NO in step S1802), the display control unit 302 ends the print setting change request processing in step S1705 illustrated in FIG. 15. On the other hand, if the display control unit 302 determines that a job print setting change request has been issued (YES in step S1802), the processing proceeds to step S1803. In step S1803, the display control unit 302 displays a change print settings screen 2000 illustrated in FIG. 17B on the display unit of the operation unit 211.

As illustrated in FIG. 17B, the change print settings screen 2000 includes information of the current login user of the image forming apparatus 101, the name of the document for which a print setting change is to be performed, print settings, and a transmit setting change button 2001. The screen illustrated in FIG. 17B is simply used as an example. Print settings which can be changed are not limited thereto. For example, tint and other print settings may be changed. The change print settings screen may be different from the example illustrated in FIG. 17B.

In step S1804, when print settings for the selected print job have been changed and the transmit setting change button 2001 has been pressed in the change print settings screen 2000, the display control unit 302 transmits the changed print settings for the selected print job to the job information acquisition unit 306. The job information acquisition unit 306 transmits a print setting change request for the selected print job based on the print settings for the selected print job to the document management server 103 on the network 100 via the network I/F 209. Specifically, the job information acquisition unit 306 issues to the document management server 103 a request for changing the print settings for the job selected from the job list screen 900, and the processing proceeds to step S1805.

In step S1805, the job information acquisition unit 306 determines whether transmission of the job deletion request in step S1801 or transmission of the print setting change request in step S1804 has been successfully completed. Specifically, when the transmission has been successfully completed and the job list changed according to the deletion request or the print setting change request has been received from the document management server 103, the job information acquisition unit 306 determines that the transmission has been successfully completed. If the job information acquisition unit 306 determines that the transmission has been successfully completed (YES in step S1805), the processing proceeds to step S1806. In step S1806, the display control unit 302 displays the changed job list received from the document management server 103 on the display unit of the operation unit 211, and ends the print setting change request processing in step S1705 illustrated in FIG. 15.

On the other hand, if the job information acquisition unit 306 determines that the transmission has failed (NO in step S1805), the processing proceeds to step S1807. In step S1807, the display control unit 302 displays a transmission error message on the display unit of the operation unit 211, and ends the print setting change request processing in step S1705 illustrated in FIG. 15.

Figure 18:
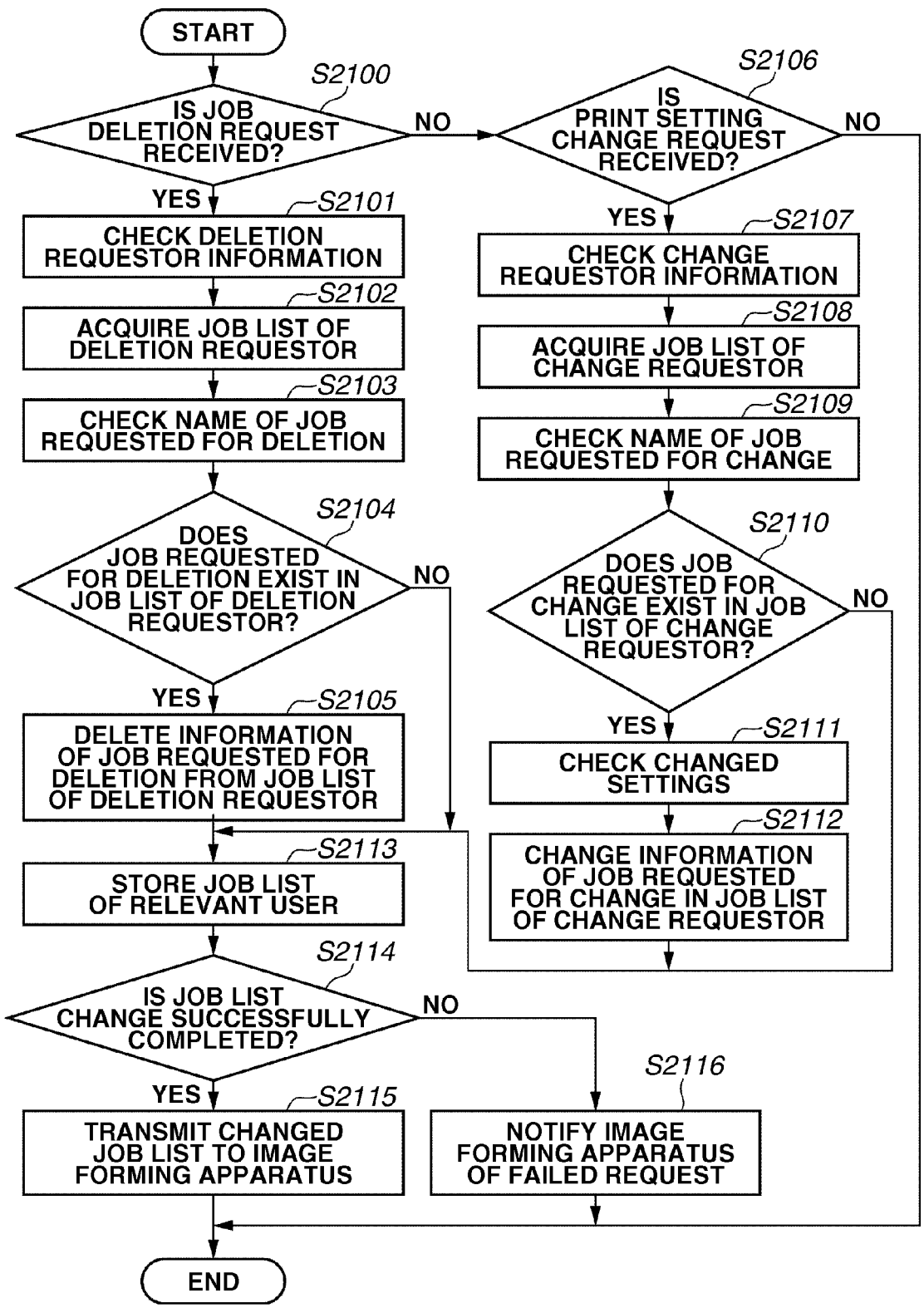
FIG. 18 is a flowchart illustrating processing performed by the document management server.

FIG. 18 is a flowchart illustrating an example of processing when the document management server 103 receives a job deletion request or a print setting change request. The flowchart illustrated in FIG. 18 includes steps S2100 to S2116. Processing illustrated in FIG. 18 is implemented when the CPU 223 of the document management server 103 executes a relevant program stored in the ROM 224 or the HDD 226.

In step S2100, the document management unit 307 determines whether the request received from the image forming apparatus 101 via the network I/F 222 is a deletion request. If the document management unit 307 determines that the request received from the image forming apparatus 101 is a deletion request (YES in step S2100), the processing proceeds to step S2101. In step S2101, the document management unit 307 checks deletion requestor information from the received deletion request information.

In step S2102, the document management unit 307 acquires from the storage unit 308 a job list (hereinafter referred to as a job list D) of the user corresponding to the deletion requestor information checked in step S2101. In step S2103, the document management unit 307 checks the name of the job requested for deletion from the received deletion request information. In step S2104, the document management unit 307 determines whether information corresponding to the job having the name of the job requested for deletion checked in step S2103 exists in the job list acquired in step S2102. If the document management unit 307 determines that the information corresponding to the job having the name of the job requested for deletion does not exist in the job list (NO in step S2104), the document management unit 307 advances the processing to step S2113.

On the other hand, if the document management unit 307 determines that the information corresponding to the job having the name of the job requested for deletion exists in the job list (YES in step S2104), the processing proceeds to step S2105. In step S2105, the document management unit 307 deletes the information corresponding to the job requested for deletion from the job list of the user corresponding to the deletion requestor information, and the processing proceeds to step S2113.

FIG. 19 illustrates an example of job lists before and after the document management unit 307 of the document management server 103 performs processing for deleting a print job from the job list of the user corresponding to the deletion requestor information in step S2105 illustrated in FIG. 18.

FIG. 19 illustrates a job list 2201 before a job requested for deletion 2203 is deleted, and a job list 2202 after the job requested for deletion 2203 has been deleted.

If the document management unit 307 determines that the request received from the image forming apparatus 101 is not a deletion request (NO in step S2100), the processing proceeds to step S2106. In step S2106, the document management unit 307 determines whether the request received from the image forming apparatus 101 via the network I/F 222 is a print setting change request.

If the document management unit 307 determines that the request received from the image forming apparatus 101 is not a print setting change request (NO in step S2106), the document management unit 307 ends the processing in this flowchart. On the other hand, if the document management unit 307 determines that the request received from the image forming apparatus 101 is a print setting change request (YES in step S2106), the processing proceeds to step S2107. In step S2107, the document management unit 307 checks change requestor information from the received print setting change request information.

In step S2108, the document management unit 307 acquires from the storage unit 308 a job list (hereinafter referred to as a job list C) of the user corresponding to the change requestor information checked in step S2107. In step S2109, the document management unit 307 checks the name of the job requested for print setting change from the received print setting change request information. In step S2110, the document management unit 307 determines whether information corresponding to the job having the name of the job requested for print setting change checked in step S2109 exists in the job list of the user corresponding to the change requestor information acquired in step S2108.

If the document management unit 307 determines that the information corresponding to the job having the name of the job requested for print setting change does not exist in the job list of the user corresponding to the change requestor information (NO in step S2110), the document management unit 307 advances the processing to step S2113. On the other hand, if the document management unit 307 determines that the information corresponding to the job having the name of the job requested for print setting change exists in the job list of the user corresponding to the change requestor information (YES in step S2110), the document management unit 307 advances the processing to step S2111.

In step S2111, the document management unit 307 checks changed settings from the received print setting change request information. In step S2112, the document management unit 307 changes the print setting information corresponding to the job requested for print setting change in the job list of the user corresponding to the change requestor information to the changed settings checked in step S2111, and the processing proceeds to step S2113.

FIG. 20 illustrates an example of a job list configuration when the document management unit 307 of the document management server 103 performs print job setting change processing on the job list of the user corresponding to the change requestor information in step S2112 illustrated in FIG. 18.

FIG. 20 illustrates a job list 2301 of the user corresponding to the change requestor information before settings 2304 of a job requested for print setting change 2303 are changed. FIG. 20 further illustrates a job list 2302 of the user corresponding to the change requestor information after the settings 2304 of the job requested for print setting change 2303 have been changed to settings 2305. In such a manner, the print settings requested to be changed by the user can be reflected in the data of the print job added to the job list of the user.

In step S2113, the document management unit 307 stores the changed job list of the user, in which the job requested for deletion has been deleted in step S2105 or the print setting information has been changed in step S2112, in the storage unit 308. In step S2114, the document management unit 307 determines whether a change to and storage of the job list have been successfully completed. If the document management unit 307 determines that the change to and storage of the job list have been successfully completed (YES in step S2114), the processing proceeds to step S2115. In step S2115, the document management unit 307 transmits the changed job list (the job list 2202 illustrated in FIG. 19 or the job list 2302 illustrated in FIG. 20) to the image forming apparatus 101 on the network 100 via the network I/F 222.

On the other hand, if the document management unit 307 determines that the change to or storage of the job list has failed (NO in step S2114), the processing proceeds to step S2116. In step S2116, the document management unit 307 transmits a notification that the processing has failed to the image forming apparatus 101 on the network 100 via the network I/F 222.

Through the above-described processing, a user requested to perform printing by another user can change print settings and therefore can set the print settings according to the user's preferences. Further, the above-described processing produces an effect that allows print settings to be made in such a way that the upper limit value and the target value for the number of pages printed by the user requested to perform printing are not exceeded. This effect enables improving the affinity between the tally application and other applications, such as pull print and secure print.

In the present exemplary embodiment, a print requestor issues a print request from the image forming apparatus 101 to another user. However, the configuration is not limited thereto. For example, the print requestor may log into the document management server 103 from an apparatus other than the image forming apparatus 101, for example, from the client PC 102, acquire the job list of the print requestor, and issue to another user a print request for a job selected from the job list.

As described above, in an environment where the document management server 103 manages job lists of users of the image forming apparatus 101, a print requestor can easily share print data of the print requestor with other users, and perform printing on the image forming apparatus 101 without effort. This makes it unnecessary for the print requestor to wait for a printing permission from other users as in conventional cases, thus improving the efficiency in processing for issuing a print request.

Although exemplary embodiments of the present invention have been described above, another exemplary embodiment of the present invention may include, for example, a system, an apparatus, a method, a program, or a storage medium. More specifically, an exemplary embodiment of the present invention is also applicable to a system including a plurality of devices or to an apparatus including a single device.

Further, any combination of the above-described exemplary embodiments is also included in an exemplary embodiment of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-018394 filed Feb. 1, 2013, which is hereby incorporated by reference herein in its entirety.

What is claimed is:

1. A system including a server and an image forming apparatus, wherein the server comprises:
   a storage unit configured to, for each user, store data corresponding to a document printable by the user in a storage device;
   a provision unit configured to, according to an instruction from a first user, provide a list of the data corresponding to a document printable by the first user stored in the storage unit;
   an addition unit configured to add data selected from the list provided by the provision unit to the storage device as data corresponding to a document printable by a second user; and
   a transmission unit configured to, if the list has been provided to the image forming apparatus by the provision unit, transmit to the image forming apparatus print data corresponding to the data selected from the list in response to a request from the image forming apparatus, and
   wherein the image forming apparatus comprises:
   a first receiving unit configured to issue a request to the server and then to receive from the server a list of data corresponding to a document printable by a user using the image forming apparatus;
   a second receiving unit configured to issue a request to the server and then to receive from the server print data corresponding to data selected from the list received by the first receiving unit;
   a printing unit configured to print the print data received by the second receiving unit; and
   an added data notification unit configured to issue a notification related to a printing of the data added by the addition unit via a display unit of the image forming apparatus during a usage of the image forming apparatus by the second user,
   wherein contents of the notification include a message from the first user to the second user and a deadline until which the added data is able to be printed.

2. The system according to claim 1, wherein the image forming apparatus further comprises a first requesting unit configured to request the server to enable the second user to print the data selected from the list received by the first receiving unit, and
   wherein, in response to a request from the first requesting unit, the addition unit adds the data selected from the list to the storage device as data corresponding to a document printable by the second user.

3. The system according to claim 1, wherein the contents of the notification further include at least one of print settings and a page count for printing the added data.

4. The system according to claim 1, wherein the image forming apparatus further comprises a change requesting unit configured to issue to the server a request for changing print settings for the data selected from the list, and
   wherein the transmission unit transmits to the image forming apparatus print data corresponding to the data selected from the list, in which the changed print settings have been reflected according to the request from the change requesting unit.

5. The system according to claim 1, wherein the image forming apparatus further comprises a counting unit configured to, when printing is performed by the printing unit, count a number of pages printed by the printing unit as a number of pages printed by the user using the image forming apparatus.

6. An image forming apparatus capable of communicating with a server for storing, for each user, data corresponding to a document printable by the user in a storage device, the image forming apparatus comprising:
   a first receiving unit configured to issue a request to the server and then to receive from the server a first list of data corresponding to a document printable by a user using the image forming apparatus;
   a second receiving unit configured to issue a request to the server and then to receive from the server print data corresponding to data selected from the first list received by the first receiving unit;
   a printing unit configured to print the print data received by the second receiving unit; and
   an added data notification unit configured to issue, via a display unit of the image forming apparatus, a notification related to a printing of the data added to a second list from the first list at the server during a usage of the image forming apparatus by the user,
   wherein the second list is a list of data corresponding to a document printable by another user, and
   wherein contents of the notification include a message from the user to the other user, and a deadline until which the added data is able to be printed.

7. The image forming apparatus according to claim 6, wherein the contents of the notification further include at least one of print settings and a page count for printing the added data.

8. The image forming apparatus according to claim 6, further comprising a change requesting unit configured to issue to the server a request for changing print settings for the data selected from the first list.

9. The image forming apparatus according to claim 6, further comprising a counting unit configured to, when printing is performed by the printing unit, count a number of pages printed by the printing unit as a number of pages printed by the user using the image forming apparatus.

10. A method for a system including a server and an image forming apparatus, the method comprising:
- causing the server to store, for each user, data corresponding to a document printable by the user in a storage device;
- causing the server to provide, according to an instruction from a first user, a list of the data corresponding to a document printable by the first user stored in the storage unit;
- causing the server to add data selected from the provided list to the storage device as data corresponding to a document printable by a second user;
- causing the server to transmit, if the list has been provided to the image forming apparatus, to the image forming apparatus print data corresponding to data selected from the list in response to a request from the image forming apparatus;
- causing the image forming apparatus to issue a request to the server and then to receive from the server a list of data corresponding to a document printable by a user using the image forming apparatus;
- causing the image forming apparatus to issue a request to the server and then to receive from the server print data corresponding to data selected from the received list;
- causing the image forming apparatus to print the received print data; and
- issuing a notification, related to a printing of the data added by the server, via a display unit of the image forming apparatus during a usage of the image forming apparatus by the second user,
- wherein contents of the notification include a message from the first user to the second user, and a deadline until which the added data is able to be printed.

11. A method for an image forming apparatus capable of communicating with a server for storing, for each user, data corresponding to a document printable by the user in a storage device, the method comprising:
- issuing a request to the server and then receiving from the server a first list of data corresponding to a document printable by a user using the image forming apparatus;
- issuing a request to the server and then receiving from the server print data corresponding to data selected from the first received list;
- printing the received print data; and
- issuing, via a display unit of the image forming apparatus, a notification related to a printing of the data added to a second list from the first list at the server during a usage of the image forming apparatus by the user,
- wherein the second list is a list of data corresponding to a document printable by another user, and
- wherein contents of the notification include a message from the user to the other user, and a deadline until which the added data is able to be printed.

12. A non-transitory computer-readable storage medium storing a computer program that causes a computer to execute a method for an image forming apparatus capable of communicating with a server for storing, for each user, data corresponding to a document printable by the user in a storage device, the method comprising:
- issuing a request to the server and then receiving from the server a first list of data corresponding to a document printable by a user using the image forming apparatus;
- issuing a request to the server and then receiving from the server print data corresponding to data selected from the first received list;
- printing the received print data; and
- issuing, via a display unit of the image forming apparatus, a notification related to a printing of the data added to a second list from the first list at the server during a usage of the image forming apparatus by the user,
- wherein the second list is a list of data corresponding to a document printable by another user and
- wherein contents of the notification include a message from the user to the other user, and a deadline until which the added data is able to be printed.

13. The image forming apparatus according to claim 6, further comprising a first requesting unit configured to request the server to enable a specified other user to print the data selected from the list received by the first receiving unit.

* * * * *